(12) United States Patent (10) Patent No.: US 12,570,481 B2
Jain (45) Date of Patent: Mar. 10, 2026

(54) CONVEYOR WITH RIGHT-ANGLED TRANSFER

(71) Applicant: INTELLIGRATED HEADQUARTERS, LLC, Mason, OH (US)

(72) Inventor: Ravi Jain, Charlotte, NC (US)

(73) Assignee: Intelligrated Headquarters, LLC, Mason, OH (US)

( * ) Notice: Subject to any disclaimer, the term of this patent is extended or adjusted under 35 U.S.C. 154(b) by 237 days.

(21) Appl. No.: 18/472,810

(22) Filed: Sep. 22, 2023

(65) Prior Publication Data

US 2024/0124248 A1 Apr. 18, 2024

(30) Foreign Application Priority Data

Oct. 12, 2022 (IN) .............................. 202211058335

(51) Int. Cl.
 *B65G 47/24* (2006.01)
 *B65G 47/64* (2006.01)
(52) U.S. Cl.
 CPC ................................. *B65G 47/642* (2013.01)
(58) Field of Classification Search
 CPC ....... B65G 47/24; B65G 47/64; B65G 47/642
 USPC ................................................. 198/413, 597
 See application file for complete search history.

(56) References Cited

U.S. PATENT DOCUMENTS

| | | | | | |
|---|---|---|---|---|---|
| 3,086,640 | A | * | 4/1963 | Verrinder | B65G 47/54 198/374 |
| 4,730,718 | A | * | 3/1988 | Fazio | B65G 47/54 198/370.1 |
| 4,926,999 | A | * | 5/1990 | Fauth, Sr. | B65G 47/54 198/463.3 |
| 4,962,841 | A | * | 10/1990 | Kloosterhouse | B65G 47/54 198/370.09 |
| 5,220,969 | A | | 6/1993 | DeBarber et al. | |
| 5,743,375 | A | * | 4/1998 | Shyr | B65G 47/54 198/463.3 |

(Continued)

FOREIGN PATENT DOCUMENTS

| | | | |
|---|---|---|---|
| CN | 212923406 | U | 4/2021 |
| EP | 1829803 | A1 | 9/2007 |
| KR | 10-2022-0052722 | A | 4/2022 |

OTHER PUBLICATIONS

Extended European Search Report Mailed on Feb. 14, 2024 for EP Application No. 23196184, 12 page(s).

(Continued)

*Primary Examiner* — Douglas A Hess
(74) *Attorney, Agent, or Firm* — Alston & Bird LLP

(57) ABSTRACT

Methods, apparatuses, systems, computing devices, and/or the like are provided. An example method may include a conveyor unit. An example conveyor unit may include a conveyor frame, a main drive connected to the frame, and a transverse drive connected to the frame. An example main drive may include at least one main roller. An example transverse drive may include at least one transverse drive belts with a drive portion and a bypass portion. An example conveyor system may include a first conveyor unit, a second conveyor unit, and a sensing system. The example method may include the sensing system detecting and determining the location of an object. The example method may also include a transverse drive applying a force to the object.

19 Claims, 19 Drawing Sheets

(56) References Cited

U.S. PATENT DOCUMENTS

| | | | | |
|---|---|---|---|---|
| 6,343,685 | B1 * | 2/2002 | Hofer | B65G 47/71 |
| | | | | 198/370.09 |
| 6,505,733 | B2 * | 1/2003 | Troupos | B65G 47/54 |
| | | | | 198/840 |
| 6,550,605 | B1 * | 4/2003 | Therrien | B65G 47/841 |
| | | | | 198/803.11 |
| 7,637,367 | B1 | 12/2009 | Cannell | |
| 7,681,717 | B2 | 3/2010 | DeGroot | |
| 8,684,169 | B2 * | 4/2014 | Itoh | B65G 13/10 |
| | | | | 198/597 |
| 9,365,361 | B1 | 6/2016 | Skarlupka | |
| 9,758,313 | B2 * | 9/2017 | Hogan | B65G 47/54 |
| 10,464,756 | B2 * | 11/2019 | Itoh | B65G 23/04 |
| 10,532,894 | B2 | 1/2020 | Kuhn | |
| 11,247,849 | B2 | 2/2022 | Kuhn et al. | |
| 11,548,734 | B2 * | 1/2023 | Fourney | B65G 13/10 |
| 2005/0126885 | A1 | 6/2005 | Brown et al. | |

OTHER PUBLICATIONS

Chiorino, "HP Compact Drive: Homogeneous and Drive belts," Technical Manual, Issue 2-EN, 32 pages, (May 2019). [Retrieved from the Internet Oct. 2, 2023: URL: <https://www.chiorino.com/public/files/Chiorino_HP_COMPACT_DRIVE_TECHNICAL_MANUAL-EN.pdf>].

Schwingshandl, "Tooth belt right angle transfer unit," 6 pages, (Dec. 3, 2022). [Retrieved from the Internet Oct. 7, 2023: URL: <https://web.archive.org/web/20221203080616/https://www.schwingshandl.com/en/solutions/cuconveyor-systems/tooth-belt-right-angle-transfer-unit>].

* cited by examiner

BOTTOM VIEW

FRONT VIEW

212

212

102

101

211

C/S SIDE VIEW

C/S ISO VIEW 212a    212b    212c

212d

1400

1401 — SENSING SYSTEM DETECTS AT LEAST ONE OBJECT TO REDIRECT FROM MAIN FLOW

1402 — SENSING SYSTEM ACTIVATES TRANSVERSE DRIVE SYSTEM TO ROTATE THE DRIVE PORTION

1403 — DRIVE PORTION ENGAGES WITH OBJECT

1404 — SENSING SYSTEM DETERMINES IF OBJECT HAS CLEARED THE CONVEYOR UNIT

END

CONVEYOR WITH RIGHT-ANGLED TRANSFER

CROSS-REFERENCE TO RELATED APPLICATIONS

This application claims priority pursuant to 35 U.S.C. 119(a) to India Application No. 202211058335, filed Oct. 12, 2022, which application is incorporated herein by reference in its entirety.

TECHNICAL FIELD

The present disclosure relates to conveyor systems. In various embodiments, a conveyor may include a belt to make right-angled transfers.

BACKGROUND

Conveyor systems may include dedicated right-angle transfer machines that raise and lower an entire transfer drive mechanism when transferring to and from a main conveyor through complex and slow lifting mechanisms or otherwise have mechanically and/or programmatically complex mechanisms that may be slow and/or prone to failure. Through applied effort, ingenuity, and innovation, Applicant has solved problems relating to right-angled transfer conveyor systems by developing solutions embodied in the present disclosure, which are described in detail below.

BRIEF SUMMARY

In general, embodiments of the present disclosure provide methods, apparatuses, systems, computing devices, computing entities, and/or the like.

Various embodiments of the present disclosure may include a conveyor unit. In some embodiments, the conveyor unit may include a conveyor frame. In some embodiments, the conveyor frame may include a main drive connected to the frame. In some embodiments, the main drive may include at least one main roller. In some embodiments, the main roller axis of rotation may be orthogonal to the main drive direction of the conveyor unit. In some embodiments, a transverse drive may be connected to the conveyor frame. In some embodiments, the transverse drive may comprise of at least one transverse drive belt. In some embodiments the at least one transverse drive belt may comprise of a drive portion and a bypass portion. In some embodiments, the drive portion and the bypass portion may be defined by outward-facing surface of the at least one transverse drive belt. In some embodiments, the drive portion may be configured to apply a force to one or more objects. In some embodiments, the force applied to one or more objects may be, at least partially, parallel to the at least one main roller axis of rotation. In some embodiments, the force may drive one or more objects in a transverse drive direction. In some embodiments, the transverse drive section may be at least partially orthogonal to the at least one main roller axis.

In some embodiments, the at least one transverse drive belt may comprise a first transverse drive belt. In some embodiments, the first transverse drive belt may engage with at least two parallel rollers. In some embodiments, the at least two parallel rollers may be disposed orthogonal to the at least one main roller axis. In some embodiments, at least one of the at least two parallel rollers may be configured to drive the first transverse drive belt, such that the first transverse drive belt may apply the force to the one or more objects.

In some embodiments, at least one of the parallel rollers is a motorized roller. In some embodiments, the at least one motorized roller may be connected to the conveyor frame, such that the motorized roller may be configured to rotate about a transverse drive axis orthogonal to the at least one main roller.

In some embodiments, the at least one transverse drive belt may comprise a first transverse drive belt, such that the first transverse drive belt may engage with at least two pulleys In some embodiments, at least one of the at least two pulleys may be configured to drive the first transverse drive belt, such that the force is applied to one or more objects.

In some embodiments, the at least one transverse drive belt may comprise a plurality of transverse drive belts, such that the plurality of transverse drive belts may be parallel to each other.

In some embodiments, the at least one main roller of the main drive may comprise of a plurality of main rollers. In some embodiments, the plurality of transverse drive belts may be disposed between respective ones of the plurality of main rollers.

In some embodiments, the at least one main roller may comprise of main rollers disposed parallel to each other.

In some embodiments, the plurality of main rollers may comprise of at least one drive roller, such that the at least one drive roller may comprise a motor and at least one idler roller.

In some embodiments, the drive portion of the at least one transverse drive belt may comprise a plurality of teeth, such that the plurality of teeth may extend from the out-ward facing surface.

In some embodiments, at least one portion of the plurality of teeth may be one or more different heights than a second portion of the plurality of teeth.

In some embodiments, at least a portion of the plurality of teeth may be configured to protrude above the uppermost surface of the at least one main roller.

In some embodiments, at least a portion of the drive portion may be configured to protrude above an uppermost surface of the at least one main roller, such that the drive portion may be configured to engage with one or more objects to convey the one or more objects in the transverse drive direction.

In some embodiments, at least a portion of the bypass portion may be configured to be disposed below an uppermost surface of the at least one main roller. In some embodiments, the bypass portion may be configured to allow the main drive to engage with one or more objects, such that the main drive may convey the one or more objects in the main drive direction.

Various embodiments of the present disclosure may include a conveyor system. In some embodiments, the conveyor system may include a sensing system. In some embodiments, the sensing system may be configured to detect a location associated with an object. In some embodiments, the conveyor system may include a plurality of conveyors units including a first conveyor unit and a second conveyor unit. In some embodiments, the first conveyor unit may include a conveyor frame. In some embodiments, the conveyor frame may include a main drive connected to the frame. In some embodiments, the main drive may include at least one main roller. In some embodiments, the main roller axis of rotation may be orthogonal to the main drive direction of the conveyor unit. In some embodiments, a transverse drive may be connected to the conveyor frame. In some embodiments, the transverse drive may comprise of at least one transverse drive belt. In some embodiments the at least one transverse drive belt may comprise of a drive portion and a bypass portion. In some embodiments, the drive portion and the bypass portion may be defined by outward-facing surface of the at least one transverse drive belt. In some embodiments, the drive portion may be configured to apply a force to one or more objects. In some embodiments, the force applied to one or more objects may be, at least partially, parallel to the at least one main roller axis of rotation. In some embodiments, the force may drive one or more objects in a transverse drive direction. In some embodiments, the transverse drive section may be at least partially orthogonal to the at least one main roller axis. In some embodiment, the second conveyor unit may be disposed adjacent to the first conveyor unit, such that the second conveyor unit may be configured to receive one or more objects following the movement of the one or more objects in the transverse drive direction.

In some embodiments, at least a portion of the drive portion may be configured to protrude above the uppermost surface of the at least one main roller, such that the drive portion may be configured to engage with one or more objects to convey the one or more objects in the transverse drive direction.

In some embodiments, at least a portion of the bypass portion may be configured to be disposed below an uppermost surface of the at least one main roller. In some embodiments, the bypass portion may be configured to allow the main drive to engage with one or more objects, such that the main drive may convey the one or more objects in the main drive direction.

In some embodiments, the at least one transverse drive belt may comprise a plurality of transverse drive belts, such that the plurality of transverse drive belts may be disposed parallel to each other. In some embodiments, the at least one main roller of the main drive may comprise a plurality of main rollers, such that the plurality of transverse drive belts may be disposed between respective one of the plurality of main rollers.

Various embodiments of the present disclosure may include a method for redirecting objects from a primary drive path. In some embodiments, the conveyor system may include a sensing system. In some embodiments, the sensing system may be configured to detect a location associated with an object. In some embodiments, the conveyor system may include a plurality of conveyors units including a first conveyor unit and a second conveyor unit. In some embodiments, the first conveyor unit may include a conveyor frame. In some embodiments, the conveyor frame may include a main drive connected to the frame. In some embodiments, the main drive may include at least one main roller. In some embodiments, the main roller axis of rotation may be orthogonal to the main drive direction of the conveyor unit. In some embodiments, a transverse drive may be connected to the conveyor frame. In some embodiments, the transverse drive may comprise of at least one transverse drive belt. In some embodiments the at least one transverse drive belt may comprise of a drive portion and a bypass portion. In some embodiments, the drive portion and the bypass portion may be defined by outward-facing surface of the at least one transverse drive belt. In some embodiments, the drive portion may be configured to apply a force to one or more objects. In some embodiments, the force applied to one or more objects may be, at least partially, parallel to the at least one main roller axis of rotation. In some embodiments, the force may drive one or more objects in a transverse drive direction. In some embodiments, the transverse drive section may be at least partially orthogonal to the at least one main roller axis. In some embodiment, the second conveyor unit may be disposed adjacent to the first conveyor unit, such that the second conveyor unit may be configured to receive one or more objects following the movement of the one or more objects in the transverse drive direction. In some embodiments, the method may include the sensing system detecting a location associated with one or more objects. In some embodiments, the method may include the sensing system triggering a transverse drive of the conveyor unit, such that the transverse drive applies a force to the one or more objects in the transverse direction. In some embodiments, the methods may include the force applied to the one or more objects may be based on the location of the one or more objects.

In some embodiments, the sensing system may comprise a computer vision system. In some embodiments, the computer vision system may be configured to capture one or more images of the object and determine the location of the object base on the one or more images.

In some embodiments, the computer vision system may be further configured to operate the transverse drive, such that the transverse drive rotates the at least one transverse drive belt until the bypass portion is facing upwards and stopping the operation of the transverse drive.

The above summary is provided merely for the purpose of summarizing some example embodiments to provide a basic understanding of some aspects of the present disclosure. Accordingly, it will be appreciated that the above-described embodiments are merely examples and should not be construed to narrow the scope or spirit of the present disclosure in any way. It will be appreciated that the scope of the present disclosure encompasses many potential embodiments in addition to those here summarized, some of which will be further described below. Other features, aspects, and advantages of the subject will become apparent from the description, the drawings, and the claims.

BRIEF DESCRIPTION OF THE DRAWINGS

The following drawings are illustrations of a particular embodiments of the present disclosure and thereof do not limit the scope or spirit of the present disclosure. The drawings are not necessarily drawn to scale, nor are they necessarily are intended for use in conjunction with the explanation in the following detailed description.

DETAILED DESCRIPTION

Figure 1:
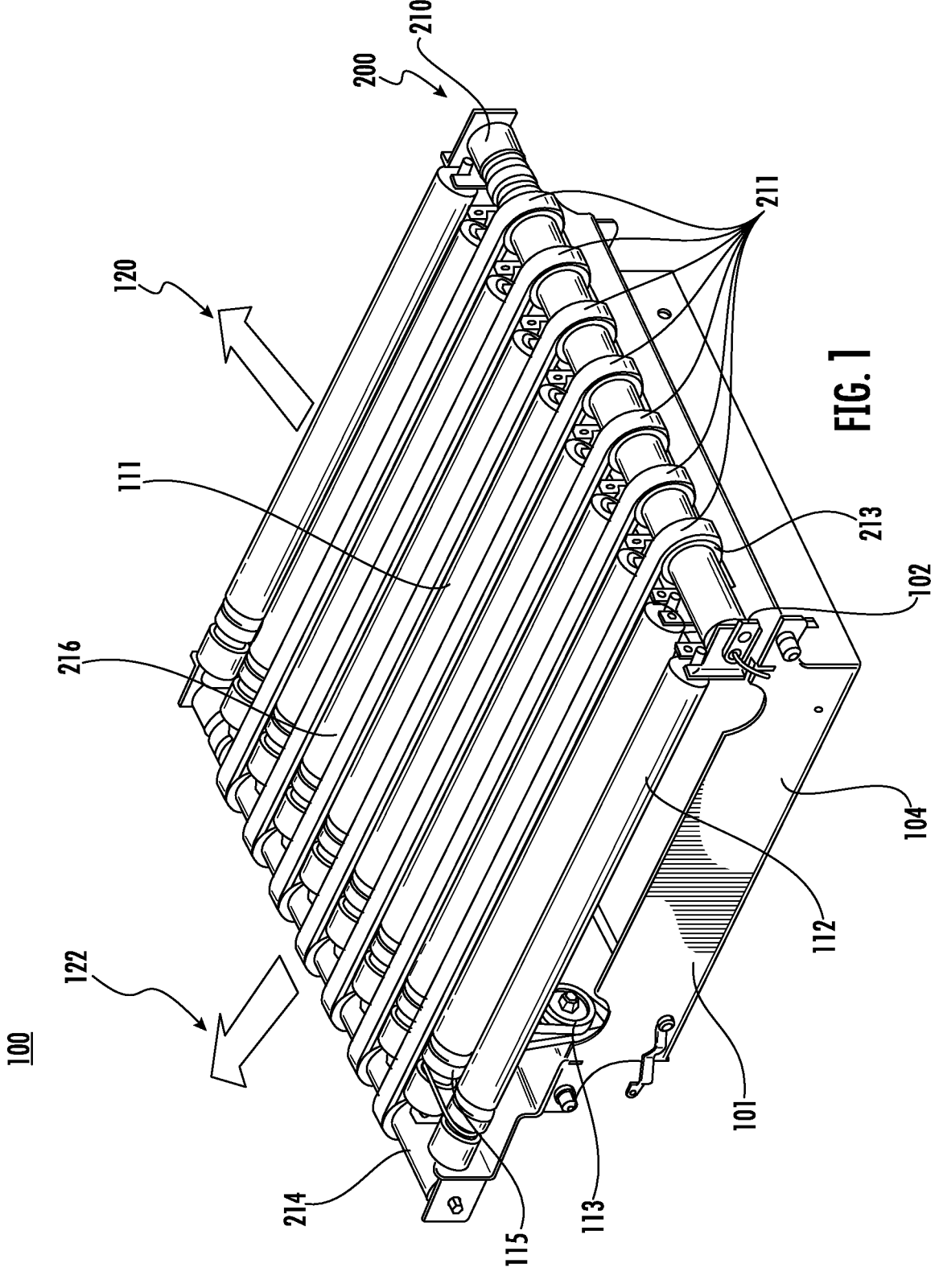
FIG. 1 illustrates a perspective view of an exemplary conveyor unit with the example drive portion of an exemplary transverse drive oriented downwards (e.g., in a retracted position) in accordance with various embodiments described herein.

Various embodiments of the present disclosure now will be described more fully hereinafter with reference to the accompanying drawings, in which some, but not all embodiments of the disclosure are shown. Indeed, this disclosure may be embodied in many different forms and should not be construed as limited to the embodiments set forth herein; rather, these embodiments are provided so that this disclosure will satisfy applicable legal requirements. The term "or" (also designated as "/") is used herein in both the alternative and conjunctive sense, unless otherwise indicated. Terms such as "example", "illustrative", and "exemplary" are used to refer to examples with no indication of quality level or preference. Like numbers may refer to like elements throughout. The phrases "in one embodiment," "according to one embodiment," and/or the like generally mean that the particular feature, structure, or characteristic following the phrase may be included in at least one embodiment of the present disclosure and may be included in more than one embodiment of the present disclosure (importantly, such phrases do not necessarily refer to the same embodiment). The present disclosure intends to include specific reference to all combinations and subcombinations of physically compatible features, components, apparatuses, and processes described herein.

As used herein, terms such as "front," "rear," "top," etc. are used for explanatory purposes in the examples provided below to describe the relative positions of certain components or portions of components and should not be construed to require absolute positions relative to the earth or another reference point outside of the described assemblies and components. As used herein, the term "or" is used in both the alternative and conjunctive sense, unless otherwise indicated. The term "along" and similarly utilized terms, means near or on, but necessarily requiring directly on an edge or other referenced location. The terms "approximately," "generally," and "substantially" refer to within manufacturing and/or engineering design tolerance for the corresponding materials and/or elements unless otherwise indicated. The use of such term is inclusive of and is intended to allow independent claiming of specific values listed. Thus, use of any such aforementioned terms, or similarly interchangeable terms, should not be taken to limit the spirit and scope of embodiments of the present invention. As used in the specification and the appended claims. The singular form of "a," "an," and "the" include plural references unless otherwise stated. The terms "includes" and/or "including," when used in the specification, specify the presence of stated features, elements, and/or components, and/or groups thereof.

As used herein, the phrase "in an embodiment," "according to one embodiment," and the like generally mean that the particular feature, structure, or characteristic following the phrase may be included in at least one embodiment of the present disclosure and may be included in more than one embodiment of the present disclosure.

If the specification states a component, feature, or structure "can," "may," "could," "should," "would," "preferably," "possibly," "typically," "optionally," "for example," "often," or "might," or other such language, be included or have a characteristic, that component, feature, or structure is not required to be included or to have the characteristic. Such component, feature, or structure may be optionally included in some embodiments, or it may be excluded.

The term "conveyor", "conveyor zone", "conveyor bed", or "conveyor unit" may be used interchangeably throughout the specification. In some embodiments, such conveyors may be combined as discussed herein with standard conveyors and/or additional conveyors with transverse drives to form one or more conveyor systems. Further, the term "conveyor rollers" or "rollers" may be used interchangeably throughout the specification.

Aspects of the present disclosure may be implemented as computer program products that comprise articles of manufacture. Such computer program products may include one or more software components including, for example, applications, software objects, methods, data structure, and/or the like. In some embodiments, a software component may be stored on one or more non-transitory computer-readable media, which computer program product may comprise the computer-readable media with software component, comprising computer executable instructions, included thereon. The various control and operational systems described herein may incorporate one or more of such computer program products and/or software components for causing the various conveyors and components thereof to operate in accordance with the functionalities described herein.

A software component may be coded in any of a variety of programming languages. An illustrative programming language may be a lower-level programming language such as an assembly language associated with a particular hardware architecture and/or operating system platform/system. Other example of programming languages included, but are not limited to, a macro language, a shell or command language, a job control language, a script language, a database query, or search language, and/or report writing language. In one or more example embodiments, a software component comprising instructions in one of the foregoing examples of programming languages may be executed directly by an operating system or other software component without having to be first transformed into another form. A software component may be stored as a file or other data storage methods. Software components of a similar type or functionally related may be stored together such as, for example, in a particular directory, folder, or library. Software components may be static (e.g., pre-established, or fixed) or dynamic (e.g., created or modified at the time of execution).

The figures of the disclosure are not necessarily drawn to scale and are provided to illustrate some examples of the invention described. The figures are not to limit the scope of the depicted embodiments or the appended claims. Aspects of the disclosure are described herein with reference to the invention to example embodiments for illustration. It should be understood that specific details, relationships, and method are set forth to provide a full understanding of the example embodiments. One of ordinary skill in the art recognize the example embodiments can be practiced without one or more specific details and/or with other methods.

As described herein, the present disclosure includes a conveyor configured to move at least one object along a primary conveyor path. The depicted conveyor further includes a transverse drive that is configured to at least partially redirect the at least one object off the primary conveyor path. In some embodiments, the transverse drive may be configured to redirect the object(s) using one or more transverse drive belts and roller assembly(ies) without changing the height of the rollers or using other complex lifting mechanisms. In some embodiments, the transverse drive belt(s) may include a drive portion configured to apply a force to the object(s) as the belt is moved by the roller assembly(ies) and a bypass portion configured to allow the one or more objects to travel along the primary drive path unimpeded by the transverse drive belt(s). In some embodiments, the drive portion may protrude above an uppermost edge of the main rollers of the conveyor and the bypass portion may be disposed below the uppermost edge. The one or more belt(s) may stretch between rollers disposed on opposite sides of one or more of the main rollers of the conveyor to drive the belts transverse to the primary drive path.

Figure 2:
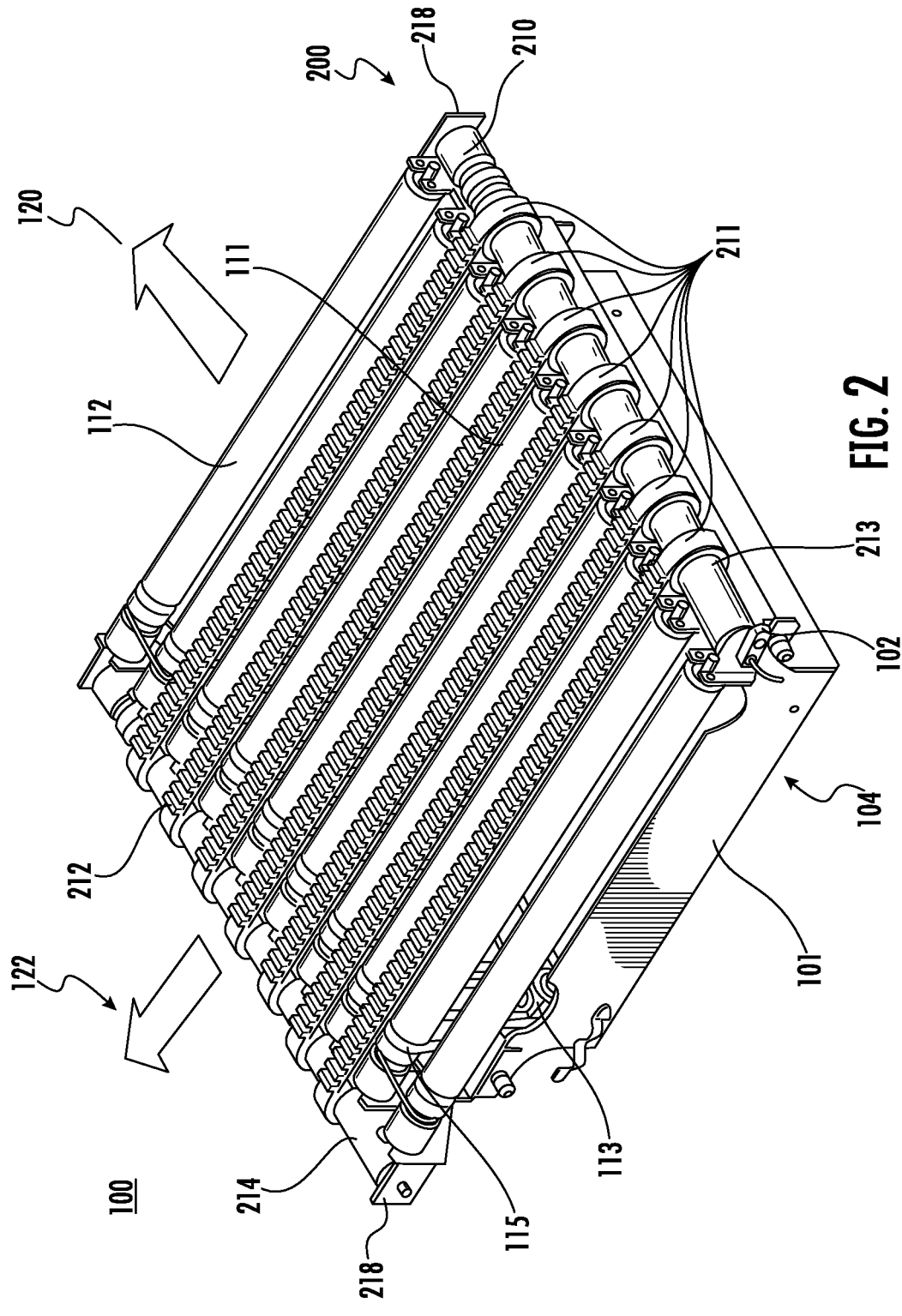
FIG. 2 illustrates a perspective view of an exemplary conveyor unit with the example drive portion of an exemplary transverse drive oriented upwards (e.g., in a deployed position) in accordance with various embodiments described herein.

FIGS. 1 and 2 illustrate a perspective view of an exemplary conveyor unit 100 comprising an example transverse drive 200 in accordance with various embodiments described herein. In various embodiments, an exemplary conveyor unit 100 may comprise at least one frame 101, a plurality of main rollers (e.g., rollers 111, 112) including at least one primary drive roller 111, and at least one transverse drive 200. For example, in the depicted embodiment, the conveyor unit 100 includes one primary drive roller 111 and nine idler rollers 112 connected to the primary drive roller via one or more belts 115. One of ordinary skill in the art will appreciate, in light of the present disclosure, that greater or fewer than one primary drive roller and/or greater or fewer than nine idler rollers may be used. The primary drive roller(s) 111 may be motorized and may include a motor within an outer shell of the roller to drive rotation of the roller relative to the frame 101. In some embodiments, the plurality of main rollers may include at least one idler roller 112 configured to be driven by the at least one primary drive roller via at least one idler belt 115. In some embodiments, the idler belt 115 may be connected to at least one pulley 113. In some embodiments, the idler belt 115 and other belts and other drive mechanisms (e.g., transverse drive belts 211) may be overlapping and/or pass through each other without affecting performance of the respective belts.

In one or more embodiments, the frame 101 may comprise one or more structural pieces. In some embodiments the frame 101 may comprise a plurality of structural elements attached to each other in the configurations depicted and described herein. In various embodiments, the size and configuration of the frame 101 may be determined by the desired roller side and layout. For example, in various embodiments, the length 103 and/or width 104 of the frame 101 may be chosen at least in part based off the desired dimensions of the at least one transverse drive 200 of the conveyor 100 and/or the desired dimensions of the primary drive path of the conveyor 100.

In various embodiments, as illustrated in FIGS. 1 and 2, an exemplary conveyor unit 100 may comprise at least one transverse drive 200 comprising at least one transverse drive belt 211. In the depicted embodiment, the at least one transverse drive 200 comprises a plurality of transverse rollers (e.g., two rollers 210, 214), including a transverse drive roller 210 configured to drive seven depicted transverse drive belts 211. One of ordinary skill in the art will appreciate, in light of the present disclosure, that greater or fewer than seven transverse drive belts 211 may be used, and in some embodiments, multiple rollers may be spaced axially along the length of the conveyor unit to drive a subset of the transverse drive belts rather than the depicted single pair of rollers. In some embodiments one or more of the plurality of rollers may comprise a pulley 213 configured to engage the at least one transverse drive belt 211. In some embodiments, the plurality of rollers may comprise at least one transverse idler roller 214 configured to be driven by the transverse drive roller 210 via the at least one transverse drive belt 211. In one or more embodiment, with reference to FIGS. 1 and 2, the at least one transverse system 200 may be configured to apply a force parallel to the direction of an axis of the at least one main roller (e.g., the axis of rotation of at least one main roller, such as the primary motorized roller, 111) to at least one object on the conveyor. In one or more embodiments, the at least one main roller 111 axis of rotation may be configured to be orthogonal to a direction 120 of the main drive path of the conveyor unit 100, and the transverse system 200 may apply the force in a transverse direction 122 direction that is orthogonal to the direction 120 of the primary drive path. In some embodiments, the force may be applied to the at least one object by a drive portion 217 (illustrated in FIG. 2) of the at least one transverse drive belt 211 to drive the object(s) at least partially towards the transverse drive path 122, while a bypass portion 216 (illustrated in FIG. 1) of the at least one transverse drive belt 211 avoids contact between the object(s) and the at least one transverse drive belt 211 to allow the main rollers 111, 112 to drive the object along the primary drive path 120. As illustrated in FIG. 1, the bypass portion 216 of the at least one transverse drive belt 211 may be disposed below the uppermost edge of the at least one main roller 111, 112. In various embodiments, as depicted in FIG. 2, the uppermost edge of the drive portion 217 of the at least one transverse drive belt 211 may be disposed above the uppermost edge of the at least one main roller 111, 112. In some embodiments, the drive portion 217 may contain one or more teeth 212 configured to protrude above the uppermost edge of the at least one main roller 111, 112 to contact the at least one object. In this manner, the plurality of transverse rollers (e.g., rollers 210, 214) may be configured to rapidly move objects transversely in either direction (e.g., to either side of the direction 120 of the main path) with one or more revolutions of the transverse drive belt 211, which may facilitate faster sorting and higher throughput compared to lifting and lowering the transverse rollers themselves.

As illustrated in FIG. 2, the drive portion 217 containing one or more teeth 212 may be configured to engage with at least one object. In various embodiments, the at least one tooth 212 on the at least one transverse drive belt 211 may be configured to engage with an object to redirect the object at least in part from the primary drive path in response to rotation of the transverse drive belt 211 by the transverse drive roller 210 and contact between the at least one tooth 212 and the object. In one or more embodiments, the at least one transverse drive 200 may be configured to redirect at least one object via the drive portion 217 of at least one transverse drive belt 211, wherein the object is redirected in a direction 122 perpendicular to the direction 120 of the primary drive path. In another example embodiment, the one or more transverse drives 200 may be configured to redirect at least one object to another parallel flow path (e.g., to an adjacent conveyor for movement in the same direction) and/or at least partially in the direction of the rotation axis of at least one main roller 111 (e.g., to another conveyor or other receiving area orthogonal to the main drive path).

Figure 3:
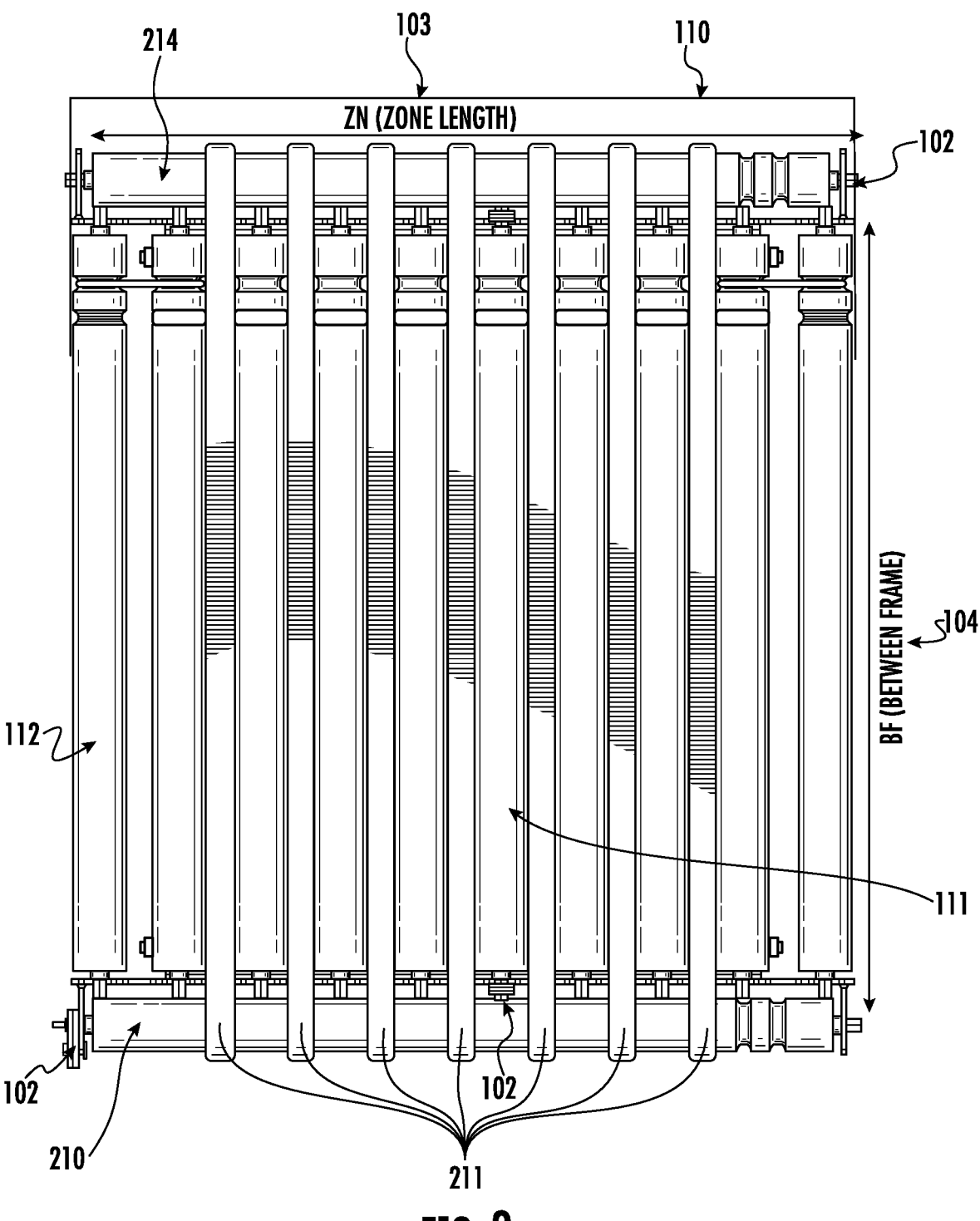
FIG. 3 illustrates a top view of an exemplary conveyor unit with the example drive portion of an exemplary transverse drive oriented downwards in accordance with various embodiments described herein.
Figure 4:
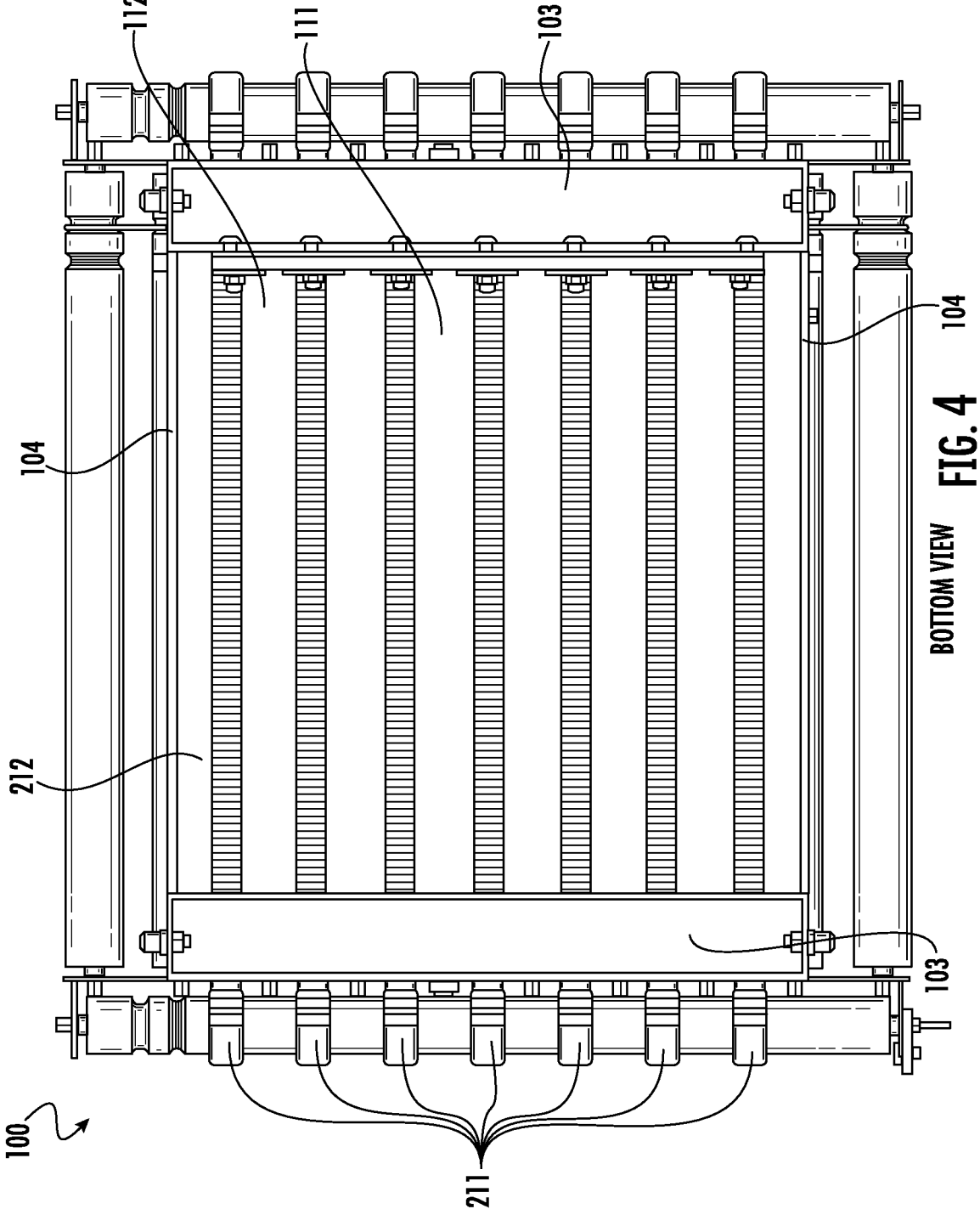
FIG. 4 illustrates a bottom view of an exemplary conveyor unit with the example drive portion of an exemplary transverse drive oriented downwards in accordance with various embodiments described herein.
Figure 5A:
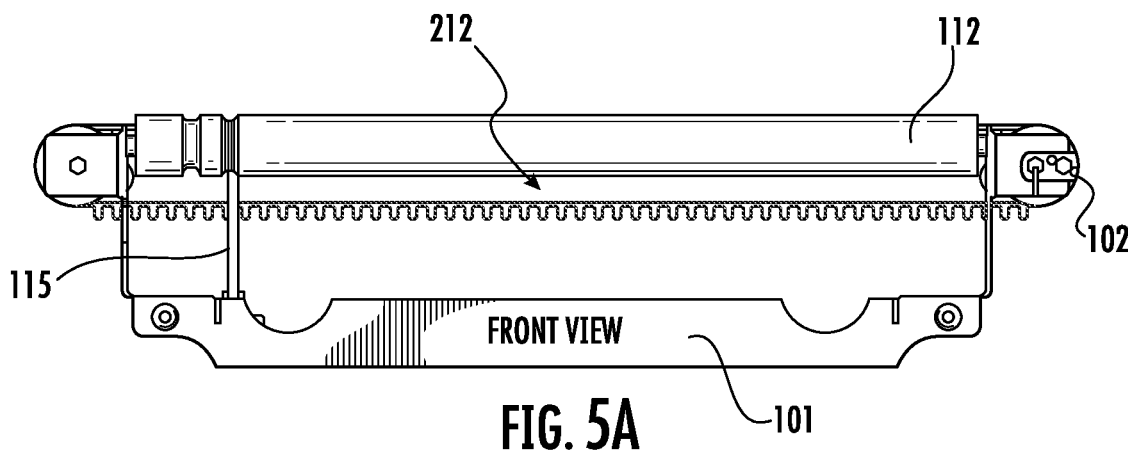
FIG. 5A illustrates a front view of an exemplary conveyor unit with the example drive portion of an exemplary transverse drive oriented downwards in accordance with various embodiments described herein.
Figure 5B:
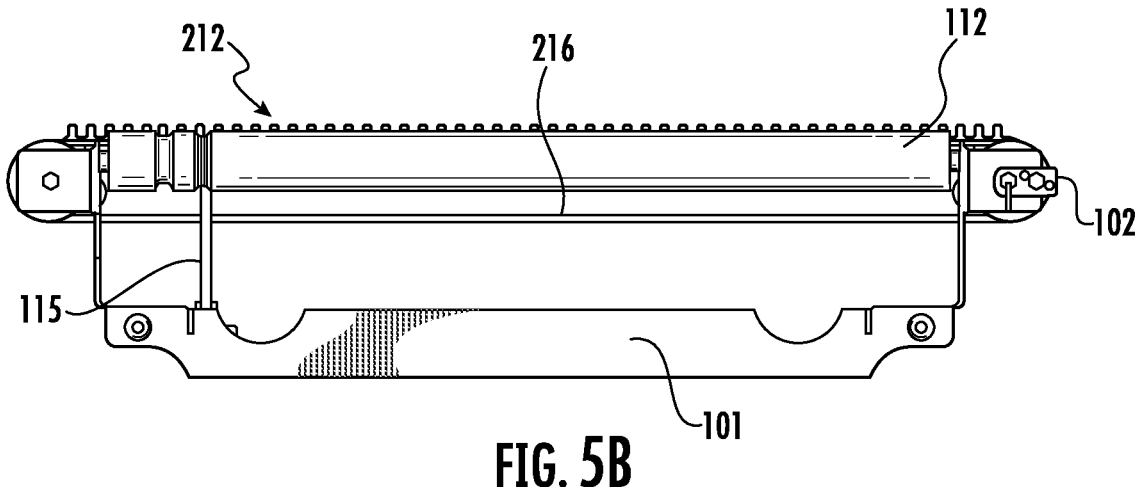
FIG. 5B illustrates a front view of an exemplary conveyor unit with the example drive portion of an exemplary transverse drive oriented upwards in accordance with various embodiments described herein.
Figure 6A:
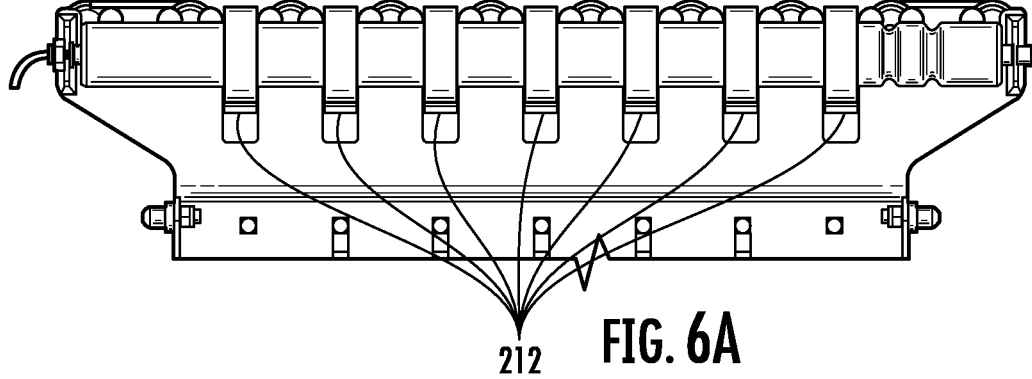
FIG. 6A illustrates a side view of an exemplary conveyor unit with the example drive portion of an exemplary transverse drive oriented downwards in accordance with various embodiments described herein.
Figure 6B:
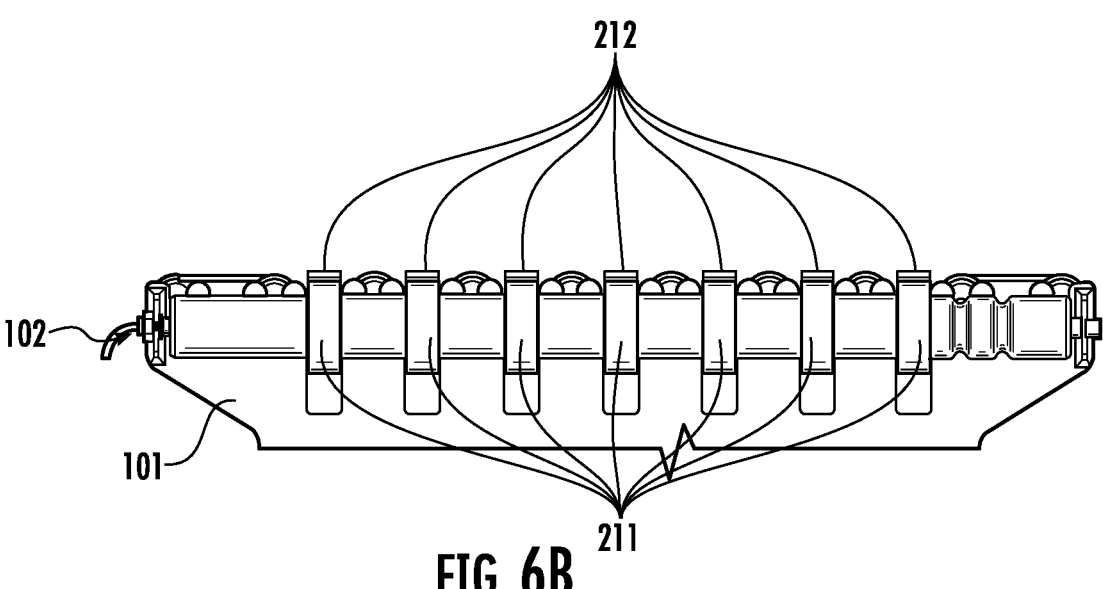
FIG. 6B illustrates a side view of an exemplary conveyor unit with the example drive portion of an exemplary transverse drive oriented upwards in accordance with various embodiments described herein.

In one or more embodiments, as depicted in FIG. 3, the conveyor 100 may define a length 103 from end to end along the main path, and the conveyor may define a width 104 perpendicular to the length. In the depicted embodiment, the conveyor is approximately square, having a width 104 equal to the length of the main rollers 111, 112 plus the width of the transverse rollers 210, 214, with any gap (if any) therebetween, and plus the edges of the transverse belt(s) 211 on the pulleys 213. Similarly the length 103 may be approximately the length of the transverse rollers 210, 214. The conveyor frame 101 may comprise one or more connection points configured to engage the axle ends of the respective rollers. In some embodiments, each of the rollers 111, 112, 210, 214 may comprise the same length and/or diameter. In some embodiments, each of the rollers 111, 112, 210, 214 may comprise the same external shape with or without an internal motor depending on the roller. In some embodiments, the depicted conveyor may be considered a conveyor unit, which may be assembled with other conveyor units into a system for conveying and directing the objects to one or more destinations.

In various embodiments, as depicted in FIGS. 1-3, the at least one conveyor unit 100 may comprise a main drive 110, wherein the main drive 110 may include at least one main roller 111, 112. In various embodiments, the at least one main rollers 111, 112 may include at least one primary drive roller 111 disposed in an assembly comprising a plurality of other rollers 112 (e.g., idler rollers) disposed parallel to each other. In various embodiments, the one or more other rollers 112 may be plain idler rollers, tampered idler rollers, rubber-coated idler rollers, rubber disc idler rollers, rubber screw idler rollers, steel screw idler rollers, and/or the like. In one or more example embodiments, the at least one idler roller 112 rotational axis may be parallel to the at least one primary drive roller 111 in the main drive 110. In various embodiments, the one or more idler rollers 112 may be engage with at least one pulley 113 via at least one idler belt 115. In various embodiments, the uppermost edge of the at least one primary drive roller 111 may be parallel with the uppermost edge of at least one idler roller 112 on at least one conveyor unit 100. Further, a system of conveyors may be arranged with two or more conveyors 100 disposed at a same height parallel to each other.

In one or more embodiments, the ends of the at least one primary drive roller 111 and/or the at least one idler roller 112 may engage with the frame 101 on either side of the primary drive path. In various embodiments, the at least one primary drive roller 111 may be a motorized roller configured to transport objects in an orthogonal direction 120 from the main roller's axis of rotation. In various embodiments, the at least one conveyor unit 100 may comprise a plurality of primary drive rollers 111 configured to move at least one object orthogonal to plurality of main rollers' axes of rotation, wherein all axes of rotation of rollers associated with the primary drive path may be parallel to each other. In one or more embodiments, at least one idler roller 112 may be disposed between at least two primary drive rollers 111. In one or more embodiments, at least one primary drive roller 111 may be disposed between two idler rollers 112.

In one or more embodiments, the at least one primary drive roller 111 and at least one transverse drive roller 210 may each be a motorized roller, wherein the roller comprises an internal portion configured to rotate the outer shell of the respective drive roller 111, 210. In one or more embodiments, the internal portion of the at least one primary drive roller and/or at least one transverse drive roller may comprise at least one bearing, at least one shock absorber, at least one spring loaded shaft, at least one gear train, and/or at least one motor. In one or more embodiments, the at least one primary drive roller 111 and/or the at least one transverse drive roller 210 may engage with the frame 101 of the conveyor unit 100 via a motor mount 102 (e.g., axle lock).

In one or more embodiments, as depicted by FIGS. 1-12A, the at least one conveyor unit 100 may comprise at least one transverse drive 200. For example, FIG. 9 depicts an isolated view of an example transverse drive 200 for illustrative purposes. The at least one transverse drive 200 may comprise at least one transverse drive roller 210, at least one idler roller 214, and at least one transverse drive belt 211. In the depicted embodiment, the transverse drive 200 includes at least one transverse system pulley 213 associated with one or both of the transverse rollers 210, 214 to engage the respective transverse drive belt(s) 211. In one or more embodiments, the at least one transverse drive roller 210 axis of rotation and the at least one idler roller 214 axis of rotation may be configured to be orthogonal to the axes of rotation of the plurality of main rollers 111, 112 of the main drive 110. In one or more embodiments, the at least one transverse drive roller 210 and/or the at least one transverse idler roller 214 may be configured to engage with the frame 101 via at least one mount 218 (which may include the motor mounts 102), as depicted in FIG. 2 formed from the frame 101. In some embodiments, the mounts 102, 218 may be attached (e.g., via nut) to the respective axles of the rollers and may be configured to at least partially tension the respective belts described herein. In some embodiments, an additional pulley (e.g., similar to pulley 113) may be connected to the frame 101 and transverse drive belts 211 to apply additional tension.

Figure 11A:
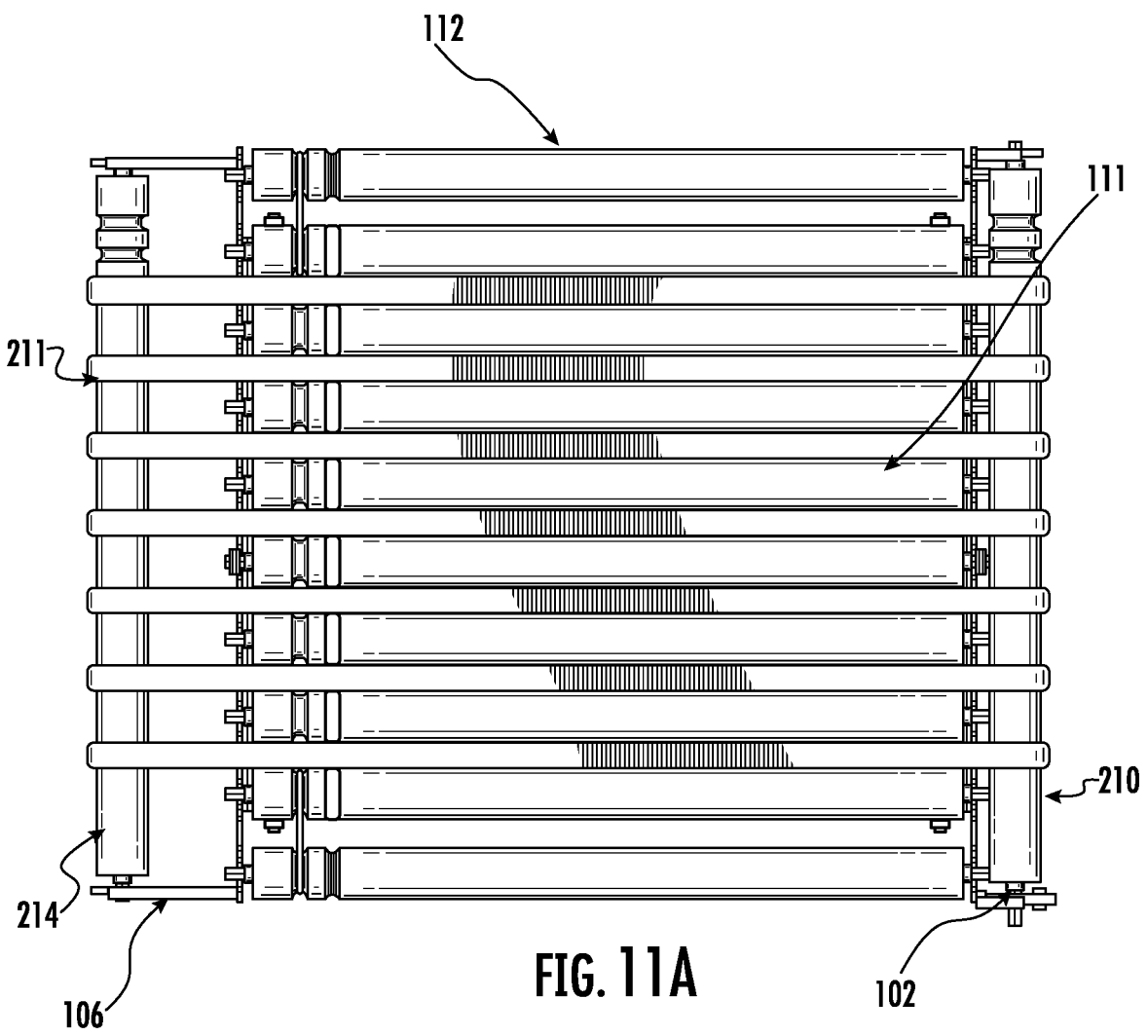
FIG. 11A illustrates a top view of an example conveyor unit with an example left extension in accordance with various embodiments described herein.
Figure 11B:
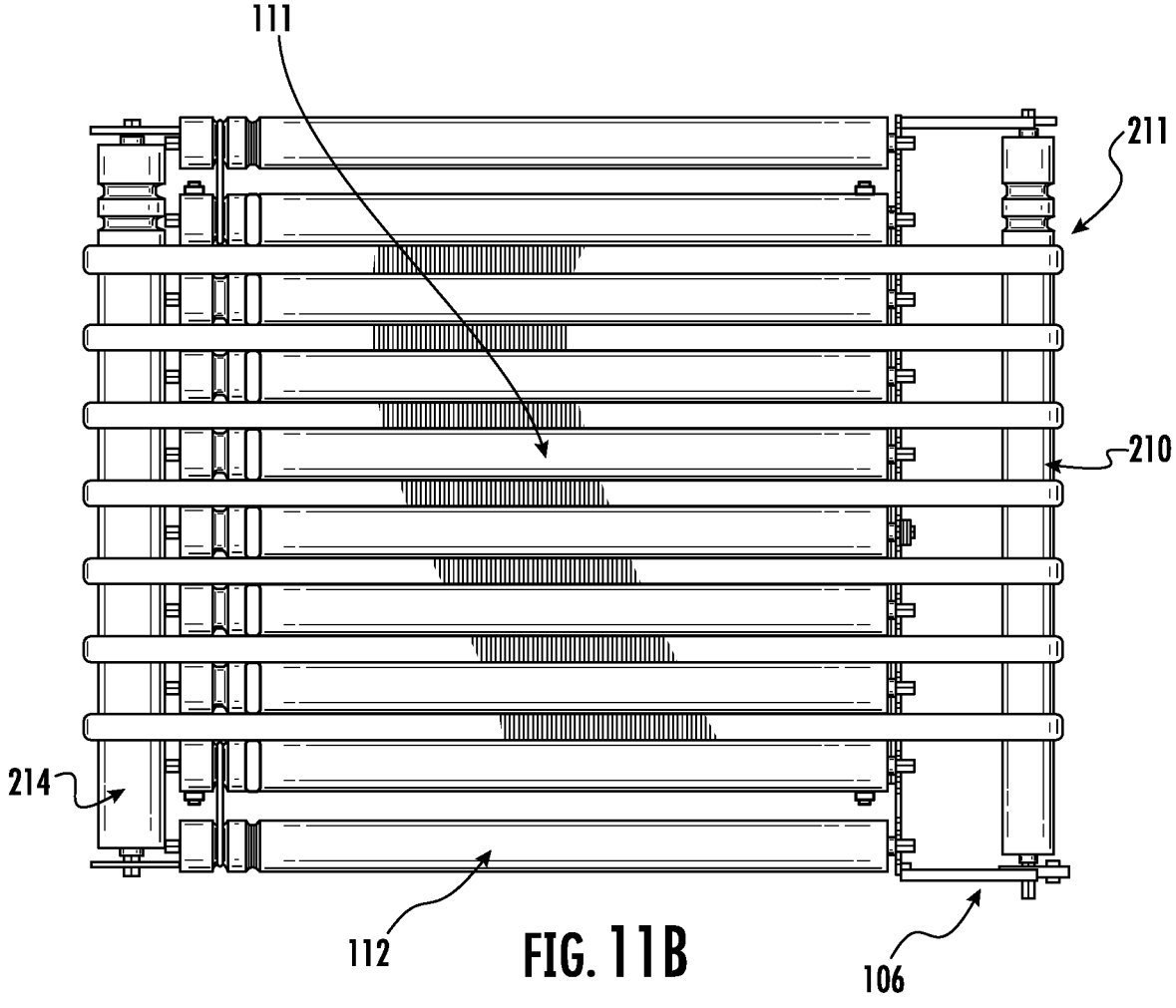
FIG. 11B illustrates a top view of an example conveyor unit with an example right extension in accordance with various embodiments described herein.
Figure 11C:
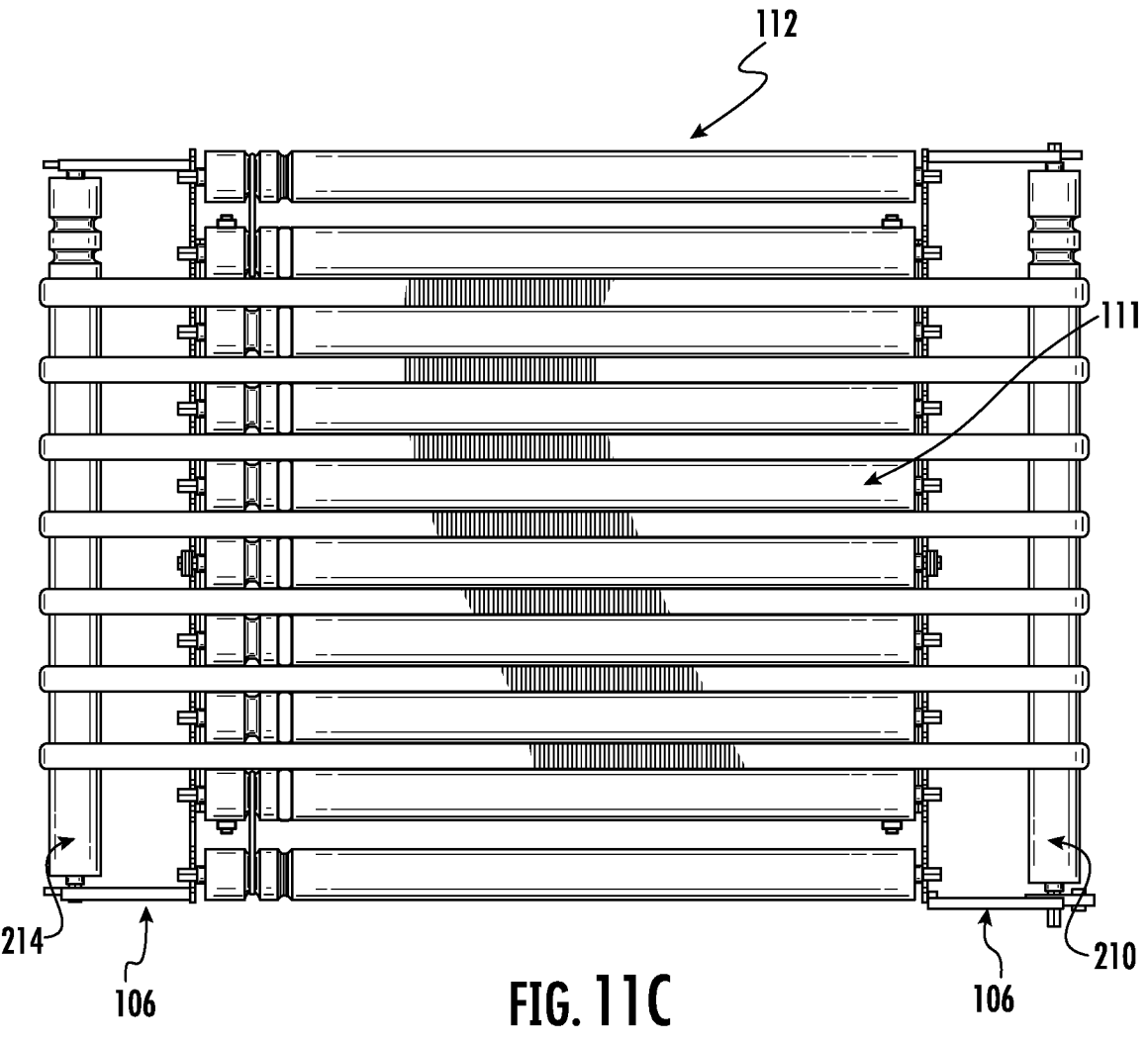
FIG. 11C illustrates a top view of an example conveyor unit with and example right and left extension in accordance with various embodiments described herein.

In various embodiments, the at least one transverse system 200 may comprise a plurality of belts 211, wherein the plurality of transverse drive belts 211 may each include one or more teeth 212 in their respective drive portions 217. In some embodiments, each transverse drive belt 211 may include a plurality of teeth 212. In one or more embodiments, as depicted in FIG. 1, the transverse drive belts 211 may each comprise a bypass portion 216, which may be disposed below the uppermost edge of the main roller 111, 112. The respective bypass portions 216 may include no teeth. In some embodiments, the base of the transverse drive belts 211 may remain at a consistent vertical position between the drive portion 217 and the bypass portion 216, while the teeth 212 account for the height difference between the two portions. In one or more embodiments, as depicted in FIG. 2, the plurality of teeth 212 may be disposed above the uppermost edge of the main roller 111, 112. In various embodiment, the one or more transverse drive belts' teeth 212 may be configured to engage with at least one object that is stationary on the conveyor 100 or traveling through the primary drive path of the conveyor unit 100. In various embodiment, as depicted in FIGS. 11A-11C, one or more extension brackets 106 may be configured on the left and/or right side of the conveyor unit 100, wherein the at least one extension brackets 106 may be configured to engage with at least a portion of the frame 101 along a side of the frame to elongate the transverse drive 200 depending on the adjacent destinations for the object and the distance thereto.

In one or more embodiments, at least one transverse drive systems 200 may comprise at least one transverse drive belt 211. In one or more embodiments, at least one transverse drive belts 211 may comprise rubber, polyurethane, neoprene, and/or the like. For example, in some embodiments, the at least one transverse drive belts 211 and/or any other belt described herein may comprise polyurethane of one or more durometers. In some embodiments, the transverse drive belts can be a standard belt having a toothed belt or toothed strip of material bonded to the standard belt (e.g., via adhesive, screws, threading, etc.). In some embodiments, the transverse drive belts may be molded as a single piece with the belt and tooth features.

Figure 12A:
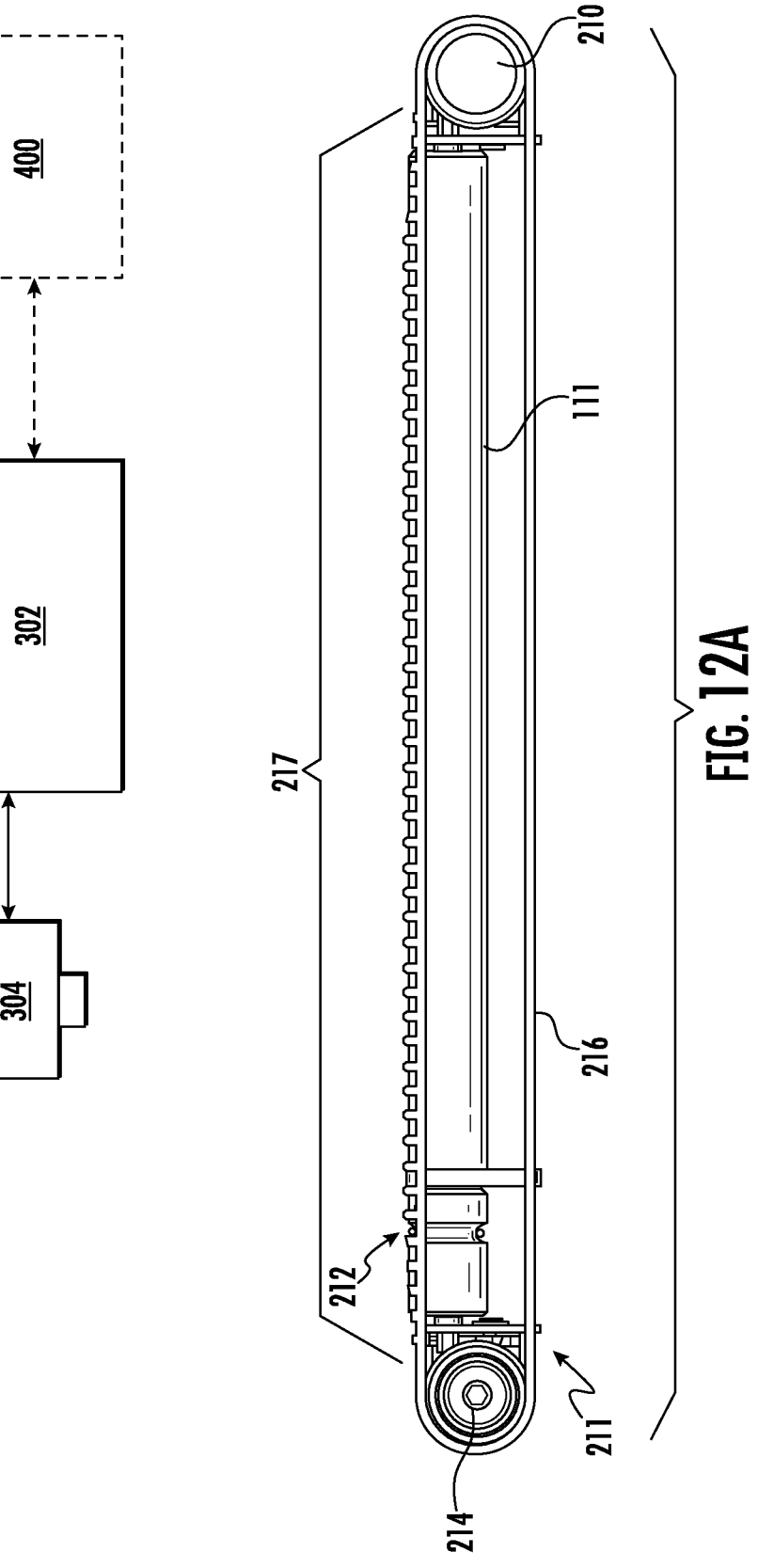
FIG. 12A illustrates a front view of an example conveyor system in accordance with various embodiments described herein.
Figure 12B:
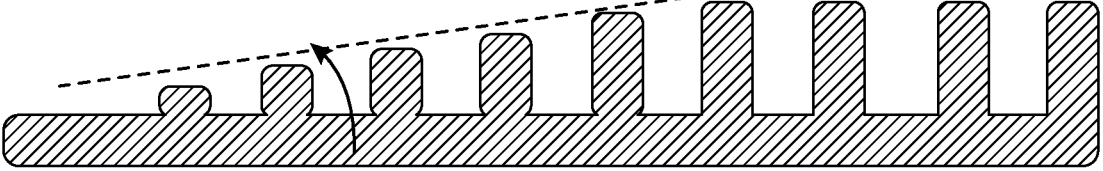
FIG. 12B illustrates an isolated view of example stepped teeth in accordance with various embodiments described herein.
Figure 12B:
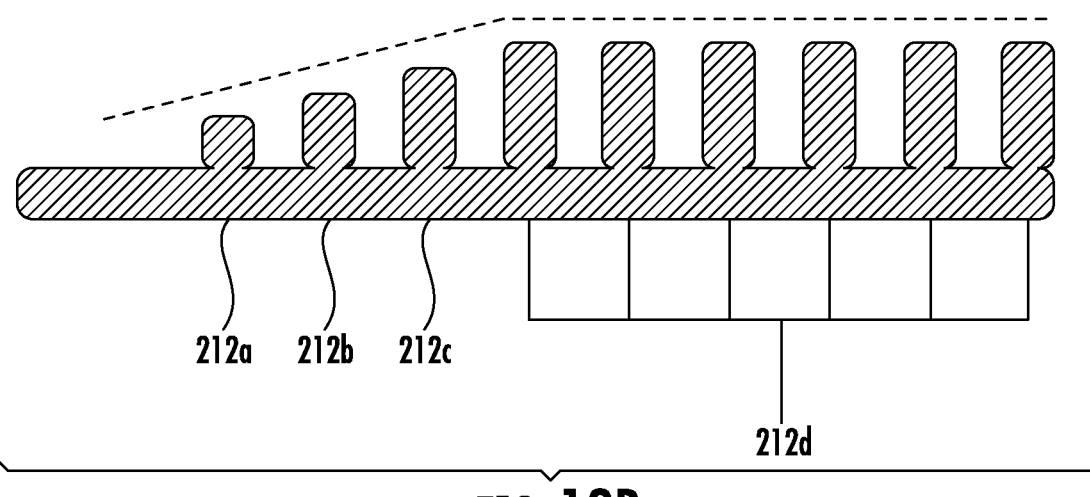

In various embodiments, as depicted in FIG. 12A, at least one belt 211 may comprise a bypass portion 216 and a drive portion 217, wherein the drive portion comprises of a plurality of teeth 212. In one or more embodiments, the drive portion 217 comprising a plurality of teeth 212 may comprise up to 50% of a length of the at least one transverse drive belt 211. In various other embodiments, the drive portion 217 comprising a plurality of teeth 212 may comprise greater than 50% of a length of the at least one transverse drive belt 211. In some embodiments, the drive portion 217 comprising a plurality of teeth 212 may comprise a maximum length of the at least one transverse drive belt 211 permitted without contacting packages on top of the main rollers 111, 112 (e.g., up to the belt length minus the main roller length). In various embodiments, the one or more transverse drive belts 211 may be configured to transport at least one object in a direction parallel to the axes of rotation of the plurality of main rollers 111, 112. In another embodiment, the plurality of teeth 212 (e.g., drive portion 217) of the at least one transverse drive belt 211 may be arranged with varying heights, such as the stepped configuration depicted in FIGS. 12A-12B in which the teeth increase in height from the outer teeth towards the center of the drive portion 217. For example, in the depicted embodiment of FIGS. 12A-12B, a middle section of teeth 212 of the drive portion 217 are the same height while the left and rightmost edges of the drive portion include teeth 212 having decreasing heights down to the shortest teeth at the edge of the drive portion. In some embodiments, the teeth 212 may be symmetrical about the mid-point of the drive portion 217. In some embodiments, the teeth 212 may be determined based on the type and/or size of package conveyed. For example, larger packages may be conveyed by larger teeth and smaller packages may be conveyed by smaller teeth. With reference to FIG. 12A, a side view is shown in which the teeth 212 can be seen protruding above the plane of the uppermost edge of the main rollers 111, 112. In some embodiments, the prominence of the teeth 212 above the uppermost edge of the main rollers 111, 112 may be determined by the type of object (e.g., weight, dimensions, materials, etc.) and/or the shape of the teeth. In some embodiments, a plurality of transverse drive belts 211 may be disposed between one or more pairs of rollers (e.g., two belts directly adjacent each other).

In one or more embodiments, at least one transverse drive belt 211 may engage, directly or indirectly, with at least one transverse drive roller 210 and at least one idler roller 214. In various embodiment, the at least one transverse drive roller 210 and at least one idler roller 214 may have rotational axes that are orthogonal to the rotational axis of at least one main roller 111, 112.

In one or more embodiment, at least one transverse drive belt 211 may further comprise a bypass portion 216. In various embodiments, the bypass portion of at least one transverse drive belt 211 may be 50% or more of the total length of the at least one transverse drive belt 211. In various embodiments, the bypass 216 section of at least one transverse drive belt 211 may be disposed below the uppermost edge of the primary drive roller 111. For example, with reference to FIG. 12A, it can be seen that the uppermost surface of the belt 211, excluding the teeth 212, is below the uppermost edge of the main roller 111, 112, such that an object traveling along the primary drive path would not contact the transverse drive belt 211 in an instance in which the bypass portion 216 is facing upwards. In one or more embodiments, the bypass portion 216 length may be equal to the length of the drive portion 217 of at least one transverse drive belt 211. In one or more embodiment, a pulley 213 may be used at least in part to support the drive belt 211, to apply a force to the drive belt 211, and/or to place at least one transverse drive belt 211 under tension. In some embodiments, the pulley 213 and/or the interior surface of the transverse drive belt 211 may include ribs, channels, and/or other features configured to aid in alignment and/or grip between the belt and pulley, including known belt and pulley surfaces and shapes.

Figure 10:
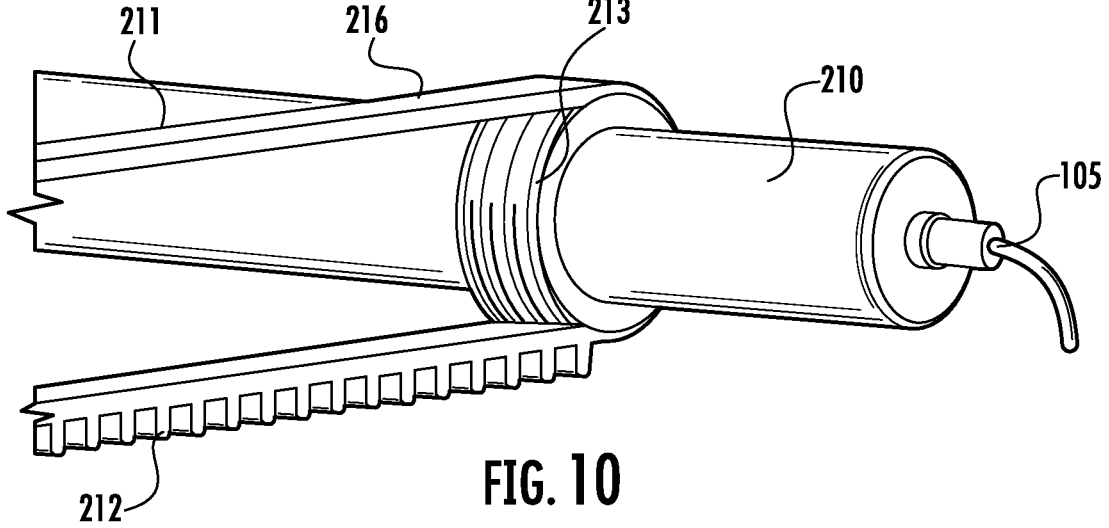
FIG. 10 illustrates a zoomed view of a portion of the example transverse drive in accordance with various embodiments described herein.

With reference to FIG. 10, in various embodiments, at least one transverse drive belt 211 my comprise at least one tooth 212 on the drive portion 217 of the belt, wherein the at least one tooth 212 faces outwards from the belt surface. In various embodiments, as depicted in FIG. 10, at least one transverse drive belt 211 comprises of a plurality of teeth 212 disposed on the drive portion 217 of the belt, wherein the teeth 212 may be equally spaced apart. In some embodiments, the teeth 212 of the drive section 217 may be disposed along up to 50% of the entire length of the one or more transverse drive belts 211. In various embodiment, the plurality of teeth 212 on the transverse drive belt may be disposed above the uppermost edge of the main drive roller 111 and/or the idler rollers 112 in the primary drive path.

Figure 13:
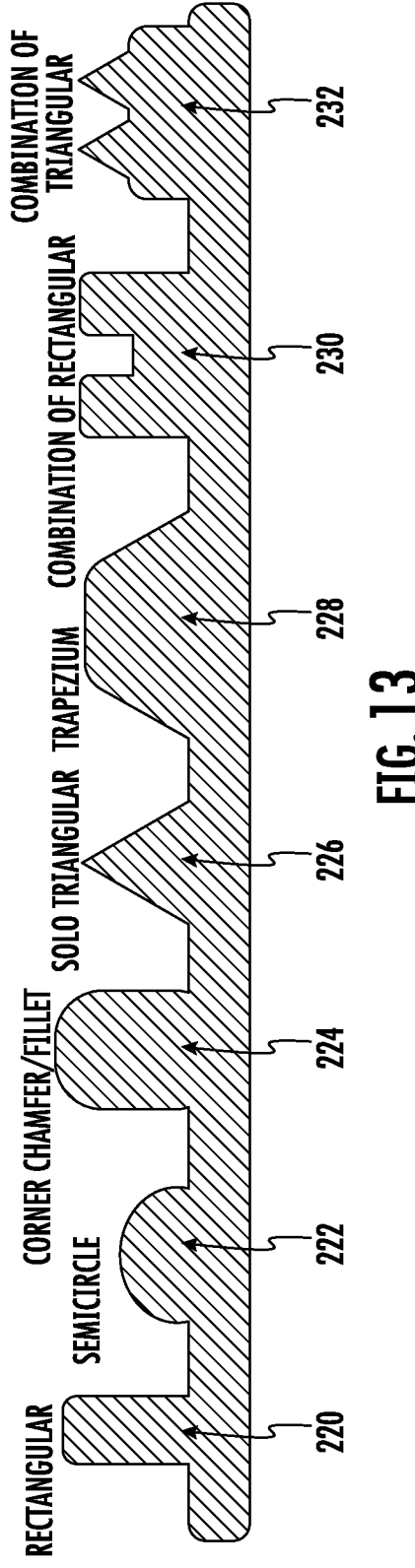
FIG. 13 illustrates a plurality of different example teeth configurations in accordance with various embodiments described herein.

FIG. 13 depicts a sample of various profiles that may be used for the teeth 212. In various embodiments, the plurality of teeth 212 of the drive portion 217 of the at least one transverse drive belt 211 may comprise a plurality of shapes. In one or more embodiments, at least one tooth 212 of the drive portion 217 may be a rectangle 220, a semi-circle 222, a chamfered/filleted rectangle 224, a triangle 226, a trapezium 228, a combination of rectangular shapes 230, a combination of triangles 232, and/or the likes. In one or more embodiments, a plurality of teeth may be made of a combination of different shaped teeth (e.g., one or more rectangles 220 with one or more triangles 226, and/or the like). In one or more embodiments, each the plurality of teeth 212 may be one same shape out of the depicted shapes (e.g., all chamfered rectangles 224 or the likes) and the embodiment shown in FIG. 13 is a sample of the different shapes that may each separately form the basis for the shape of all teeth 212 on a transverse drive belt 211. In one or more embodiments, the shape of teeth selected for at least one transverse drive belt 211 may be selected based off the at least one object that the drive portion 217 may be moving (e.g., different gripping structures for different objects). In one or more embodiments, at least one tooth 212 may be made out of the same material of the transverse drive belt the at least one tooth is adjoined to (e.g., rubber, polyurethan, neoprene, and/or the likes).

In one or more embodiments, the at least one transverse drive systems 200 may be configured to transport at least one object at least partially in the orthogonal direction (e.g., the direction 122 shown in FIG. 1) from the primary conveyor drive path (e.g., path 120 shown in FIG. 1). In various embodiments, one or more transverse drive belts 211 may be configured to engage with at least one object and transport at least one object completely orthogonal from the primary drive path to an additional flow path. In some embodiments, the main rollers 111, 112 may stop the object prior to or at the same time as activating the transverse rollers 210, 214, such that the object comes to a stop in the primary direction before moving orthogonally.

In various embodiments, the one or more transverse drive belt 211 transports one or more objects orthogonally from the primary drive path and transfer to another flow path that runs parallel to the primary drive path (e.g., a secondary drive path on a secondary conveyor running along the same direction as the primary drive path 120, either in the same direction or in opposite directions). In various embodiments, one or more transverse drive belts 211 may be configured to partially transport at least one object orthogonally from the primary drive path, wherein the at least one object remains on the primary drive path but in a laterally different location. In some embodiments, the one or more transverse drive belt 211 transports one or more objects orthogonally from the primary drive path and transfer to another flow path that runs perpendicular to the primary drive path (e.g., a secondary drive path on a secondary conveyor running perpendicular to the primary drive path 120, either to the left or the right of the main conveyor).

In various embodiment, as depicted in FIGS. 11A-11C, at least one extension bracket 106 may be configured to engage with the frame 101 of at least one conveyor unit 100. In one or more embodiments, at least one extension bracket 106 may engage with the left side of the frame 101 and extend parallel to the axis of rotation of the primary drive roller 111, as depicted in FIG. 11A. In various embodiments, at least one bracket may be configured to engage with a right side of the frame 101 of at least one conveyor unit 100, as depicted in FIG. 11B, wherein the bracket may extend in a direction parallel to the axis of rotation of the main drive roller 111. In some embodiments, the extension bracket(s) 106 may be telescoping features and/or separately attachable components on the frame 101. In various embodiments, one or more extension brackets 106 may be configured to engage with the frame 101 of at least one conveyor unit 100 and extend parallel to the axis of rotation of the main roller 111 on both the left and right side of the frame 103. In various embodiment, at least one transverse idler roller 214 and/or at least one transverse drive roller 210 may be configured to engage with at least one extension bracket 106. In one or more embodiments, at least one idler roller 214 and at least one transverse drive roller 210 may be configured to engage with at least one bracket 106. In various embodiments, at least one transverse idler roller 214 and/or at least one transverse drive roller 210 may be configured such that the length of the at least one transverse idler roller 214 and/or at least one transverse drive roller 210 may be longer and/or shorter than the width of the conveyor unit. In some embodiments, each conveyor unit may have multiple idler rollers 214 and/or multiple transverse drive rollers 210 spaced axially from each other.

Figures 15A, 15B, 15C:
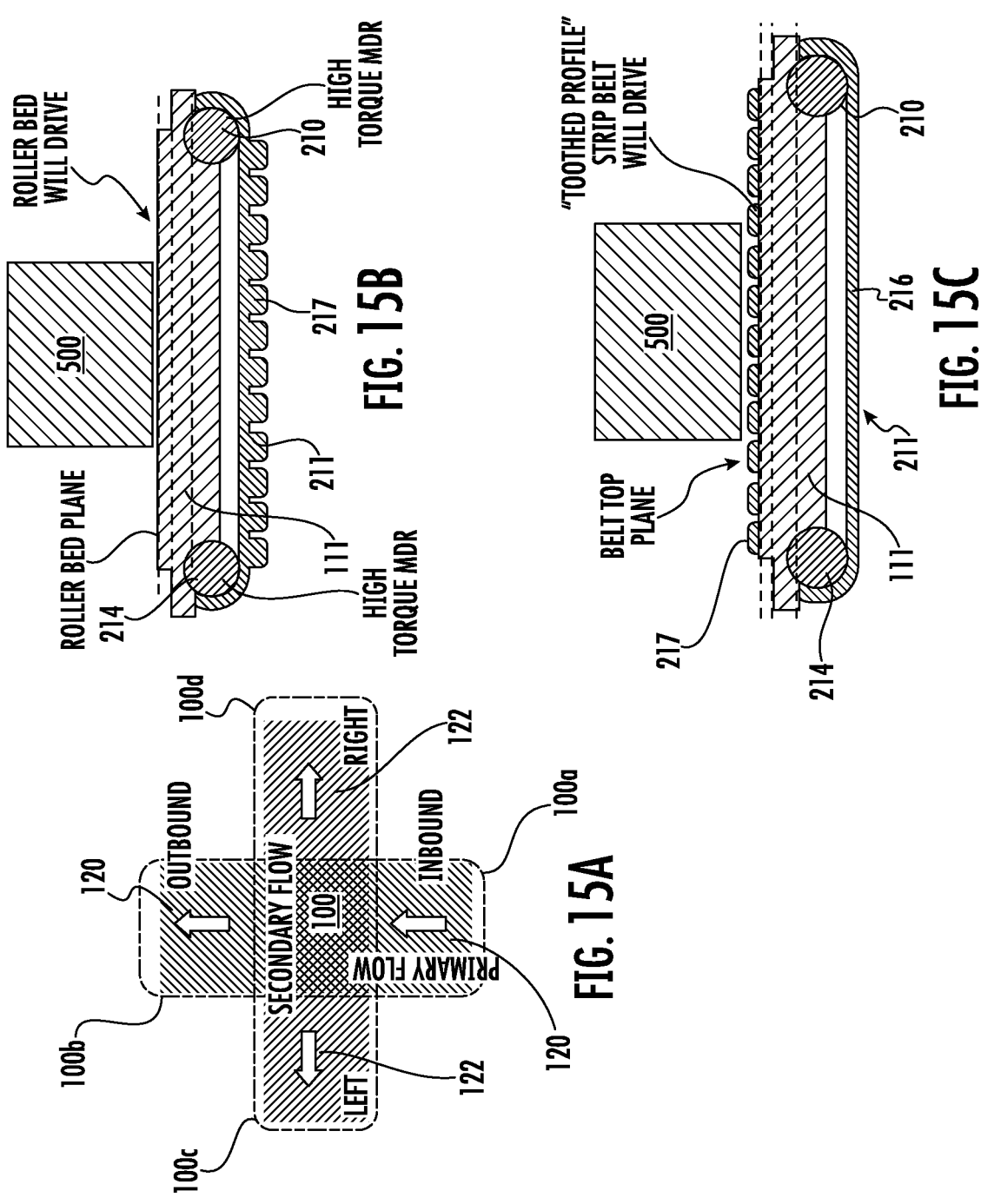
FIG. 15A illustrates a simplified diagram of a conveyor system in accordance with various embodiments described herein.
FIGS. 15B-15C illustrate simplified side views of a conveyor unit having a drive portion respectively disengaged from an object and engaged with an object in accordance with various embodiments described herein.
Figure 16:
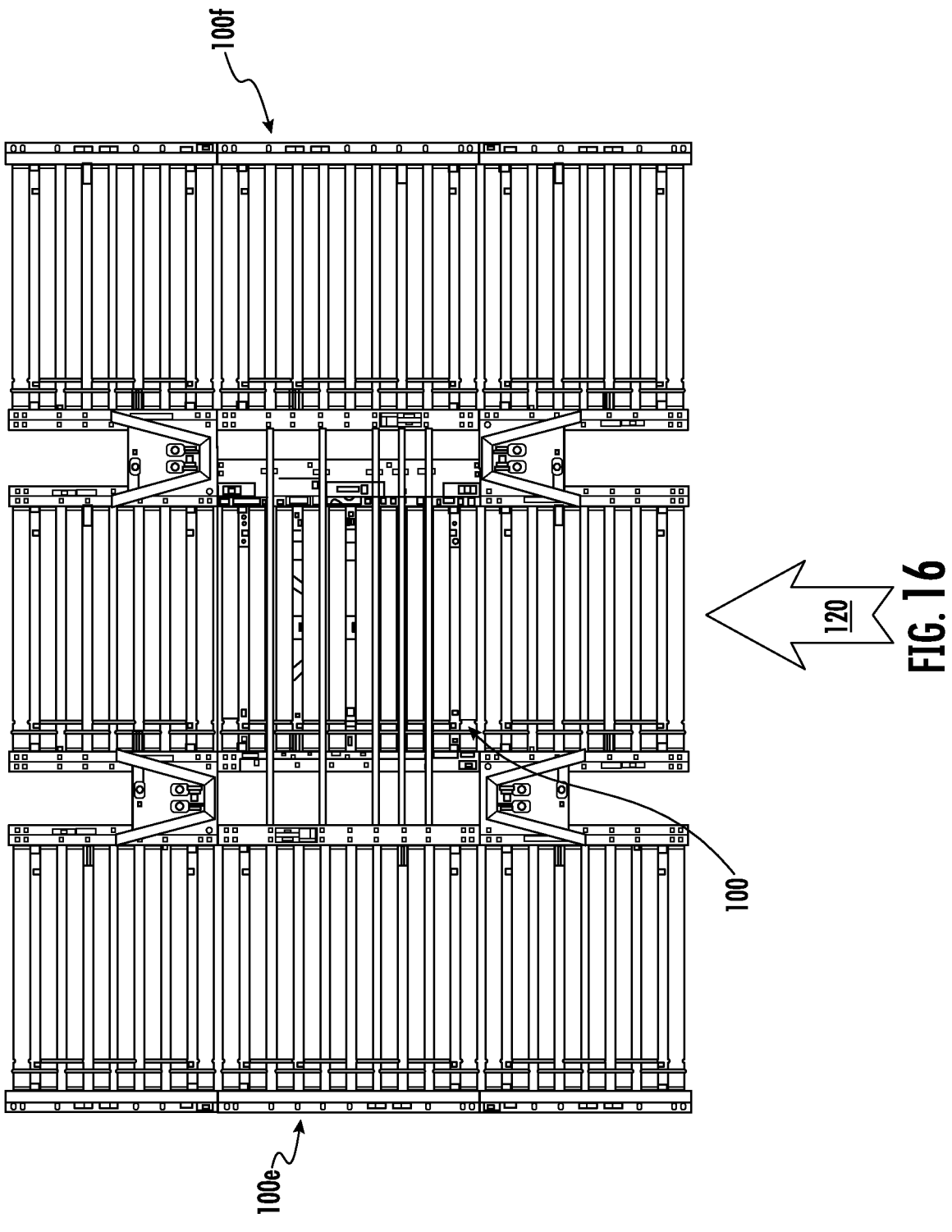
FIG. 16 illustrates a simplified diagram of a conveyor system in accordance with various embodiments described herein.

In one or more embodiments, with reference to FIG. 15A, the conveyor system may comprise a plurality of conveyor units 100, 100a, 100b, 100c, 100d in accordance with the present disclosure. In various embodiments, at least one additional conveyor units 100a, 100b, 100c, 100d may be placed next to a first conveyor unit 100 along either of the sides, the front, or the rear of the conveyor units and may be configured to have a primary drive path parallel to or non-parallel to (e.g., perpendicular to) the primary drive path of the first conveyor unit to create any desired drive path(s) for the objects. In some embodiments, one or more of the additional conveyor units 100a, 100b, 100c, 100d may be standard, linear conveyor units. In some embodiments, one or more of the additional conveyor units 100a, 100b, 100c, 100d may be right-angle transfer conveyor units. The embodiment of FIG. 15A depicts a first, inflow conveyor 100a configured to feed objects into the conveyor; a second, outflow conveyor 100b configured to receive objects out of the conveyor along the primary drive path 120. The embodiment of FIG. 15A further depicts left 100c and right 100d conveyors configured to receive objects from the conveyor 100 along the transverse drive paths 122 and carry the objects perpendicularly to the primary drive path. In some embodiments, a one or more conveyors 100a, 100b, 100c, 100d may be disposed adjacent the conveyor 100 for its/their respective purposes. The embodiment of FIG. 16 depicts a conveyor system having two parallel conveyors 100e, 100f disposed parallel to the primary drive path 120, and the conveyor 100 may be configured to transfer objects over to either of the parallel conveyors which may operate in either longitudinal direction. In some embodiments, a single parallel conveyor may be disposed adjacent the conveyor 100.

Figure 7:
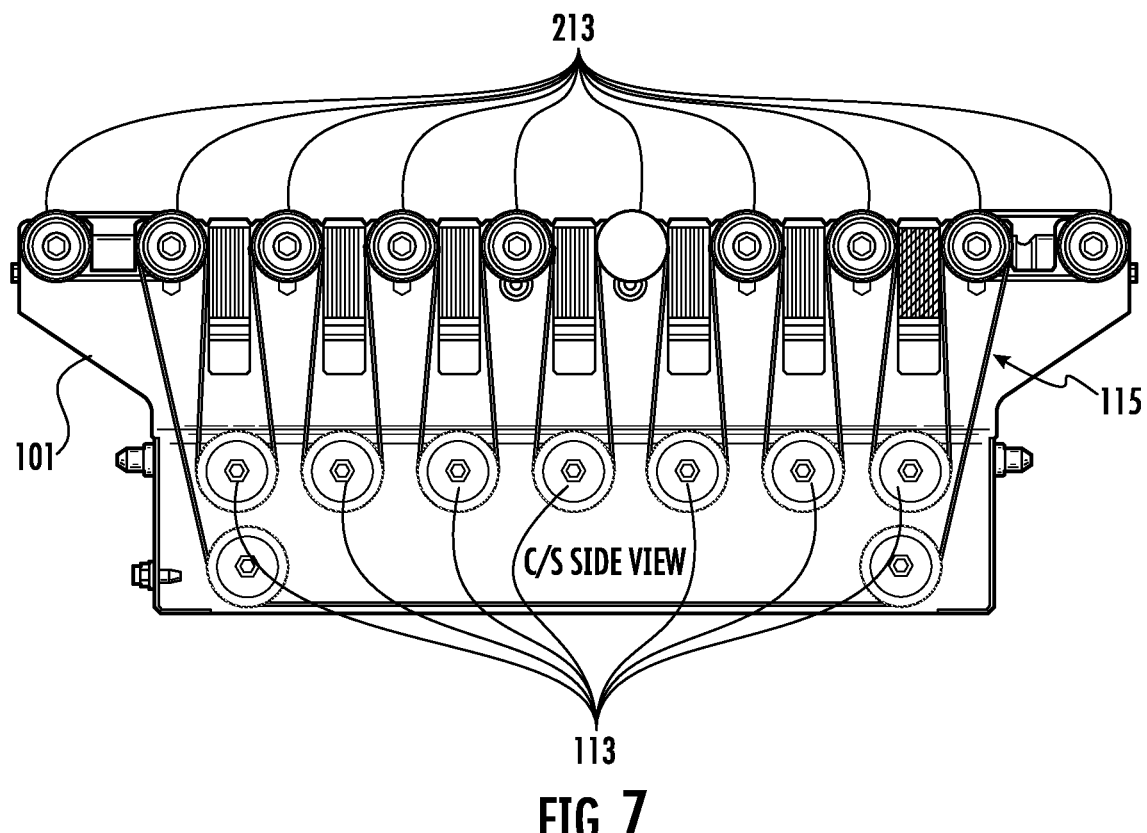
FIG. 7 illustrates a cross-sectional side view of an exemplary conveyor unit in accordance with various embodiments described herein.
Figure 8:
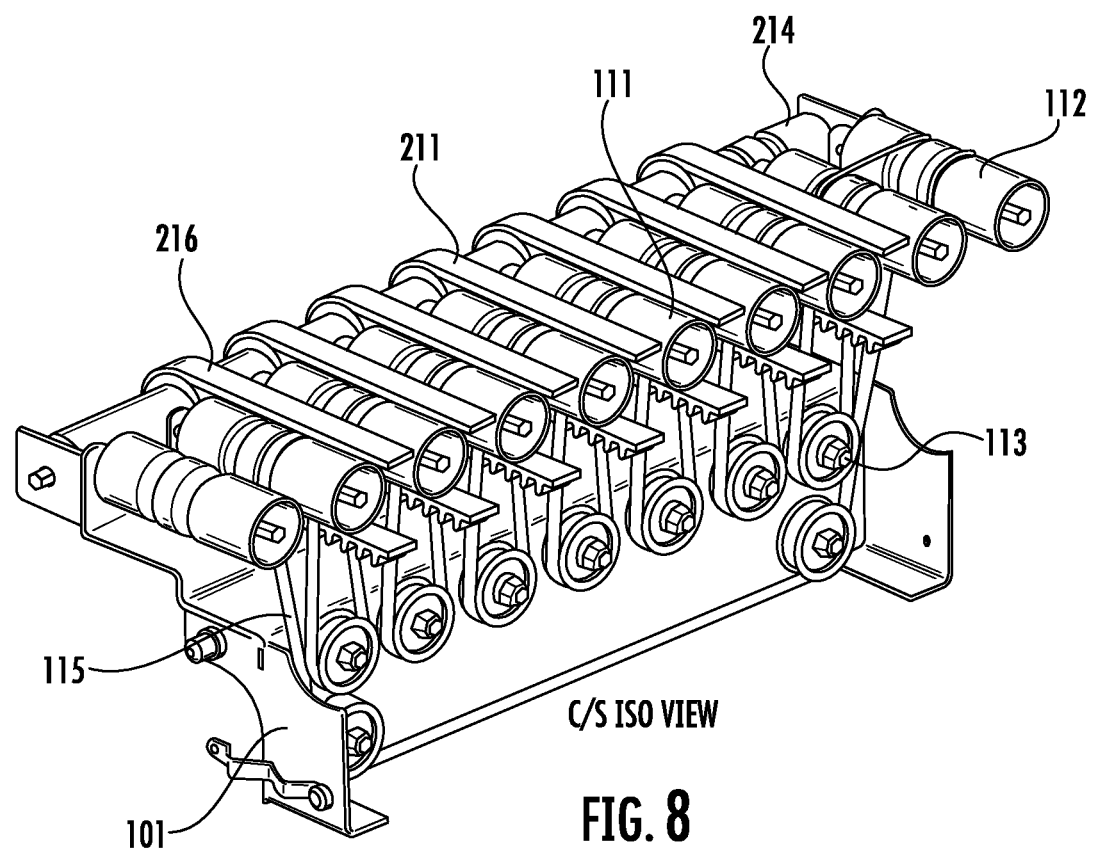
FIG. 8 illustrates a perspective, cross-sectional view of an exemplary conveyor unit with an example transverse drive, in accordance with various embodiments described herein.
Figure 9:
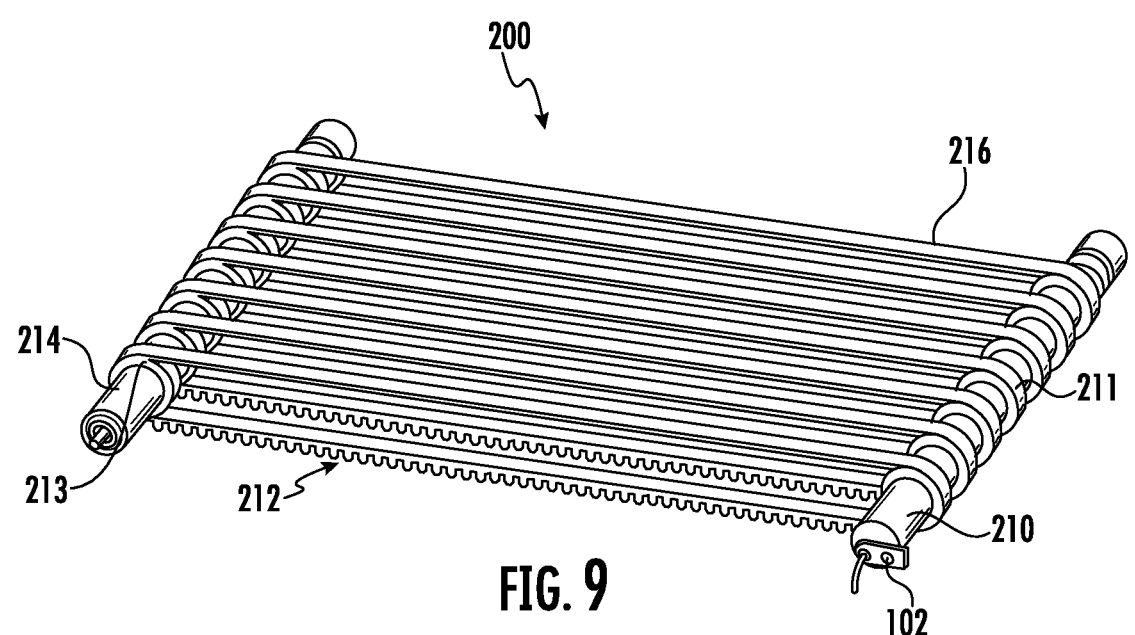
FIG. 9 illustrates a perspective view of the example transverse drive isolated from the example conveyor unit in accordance with various embodiments described herein.

In one or more embodiments, as depicted in FIGS. 7 and 8, one or more pulleys 113 may be disposed vertically below the lowermost edge of the main rollers 111, 112. In various embodiments, a plurality of pulleys 113 may be arranged at least in part in a linear fashion (e.g., a straight line) one after another. In one of more embodiments, a plurality of pulleys 113 may be arranged at least in part in a staggered fashion. In various embodiment, as depicted in FIG. 8, at least one pulley 113 may engage with at least one idler belt 115, wherein the at least one idler belt may be configured to traverse the entire length of conveyor unit 100 to drive the respective idler rollers 112. In one or more embodiments, the at least one idler belt 115 may be configured to engage with at least one primary drive roller 111 and at least one idler roller 112 of the primary drive system to transfer drive energy from the primary drive roller(s) 111 to the idler roller(s) 112. In one or more embodiments, the at least one idler belt 115 engages with the primary drive roller 111, traverses below the lowermost edge of the primary drive roller 111 (e.g., around a pulley 113) and engages around the uppermost edge of at least one idler roller 112. In some embodiments, the at least one idler belt 115 may extend directly between adjacent rollers 111, 112 to transfer energy therebetween (e.g., between the primary drive roller 111 and an adjacent idler roller 112 or between two idler rollers 112 wherein one is otherwise connected to the primary drive roller 111 or another idler roller) without passing over a pulley. In some embodiments, multiple idler belts 115 may be used between various rollers 111, 112 in any configuration capable of transferring drive energy from one or more primary drive rollers 111 to one or more idler rollers 112. In an example embodiment, the at least one idler belt 115 may be configured to distribute a force created by the at least one primary drive roller 111 to at least one idler roller 112, either directly or indirectly.

In one or more embodiments, at least one sensing system 300 may be configured to detect the position and/or trajectory of one or more objects traveling along the conveyor. For example, with reference to FIG. 12A, some embodiments of the sensing system 300 (e.g., a computer vision system) may include a computing device 302 having at least a processor, memory, and input/output circuitry and an imaging deice 304 (e.g., a camera), with the imaging device being oriented towards the conveyor to image the object(s) and configured to capture one or more images (e.g., still images and/or video) and to process the images to determine a location of the object(s) relative to the conveyor system.

Signals generated by the sensing system 300 may be used to activate the transverse drive 200 in an instance in which the object is detected on the conveyor or approaching the conveyor and the object is determined (e.g., by one or more processors running a logistics software in response to the signals from the sensing system) to require transverse movement at the conveyor. In some embodiments, the sensing system 300 may connect (e.g., via a wired or wireless network connection) to a control and logistics computing system 400 comprising at least a processor, memory, and input/output circuitry, with the memory comprising computer program instructions configured to receive the signals from the sensing system 300 and determine one or more operational signals for causing operation of the conveyor. In some embodiments, the computing system 400 may include a control card for each conveyor unit of a conveyor system, which control cards may be respectively mounted to the frames of each conveyor unit and wired or wirelessly connected to a primary control system. In some embodiments, the computing device 302 and control and logistics computing system 400 may be embodied as the same device or set of devices configured to perform the operations described herein. In some embodiments, the computing device 302 and/or control and logistics computing system 400 may be local devices in a same facility as the conveyor or may include one or more remote computing devices, including cloud-based computing systems. In the example embodiment, the drive portion 217 comprising a plurality of teeth 212 may be configured to engage with at least one object when the transverse drive belt 211 is activated to rotate the drive portion 217 from a default, neutral position along the bottom of the belt 211 into a drive direction to cause lateral movement of the object when the teeth 212 are driven into contact with the object. In various embodiments, any known sensing system may be used, including laser sensors, infrared (IR) sensors, pressure sensors, ultrasonic sensors, load sensors, vibration sensors, or the like.

Figure 14:
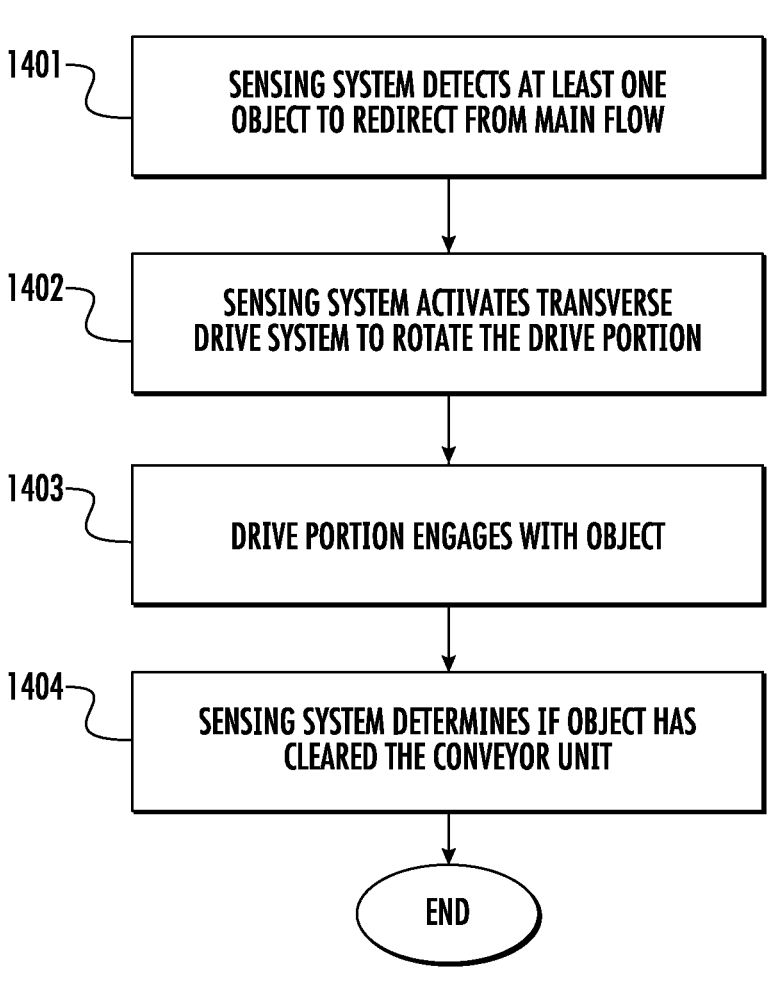
FIG. 14 illustrates an example flow diagram of an example process for operating a conveyor system in accordance with various embodiments described herein.

In one or more embodiments, the at least one sensing system may comprise at least one imaging device 304. In various embodiments, an imaging device may be a 2-D imaging device and/or a 3-D imaging device. In multiple embodiments, with reference to FIG. 14, the sensing system 300 may be configured to detect one or more objects in the primary drive path that at least in part need to be redirected in an orthogonal direction to the primary drive path. FIG. 14 is an example flow diagram illustrating example sensing system's method and sub-methods of detecting and redirecting an object in accordance with various embodiments of the present disclosure. In various embodiments, these example flow diagrams illustrated in FIG. 14 for detecting and redirecting 1400 are performed in reference to various embodiments of the sensing system 300, transverse drive 200, and conveyor 100 depicted in other figures. In various embodiments, the steps in the example flow diagrams in FIG. 14 (e.g., 1401, 1402, 1403, and 1404) may be performed sequentially (e.g., 1401 and 1402), while in other embodiments some steps may occur simultaneously (e.g., 1401 and 1402) for the same or different objects, or in any order necessary to achieve a desired outcome. In some embodiments, portions of the depicted process may be performed individually or in sub-combinations without departing from the scope of the present disclosure (e.g., steps 1401, 1402, and 1403).

In one or more embodiment, the at least one sensing system 300, itself or via one or more intermediary computing systems 400 (illustrated in FIG. 12A) may be configured to transmit a signal to the at least one transverse drive roller 210. The at least one signal from the sensing system 300 may at least in part cause activation of the motor of the transverse drive roller 210. In various embodiments, the transverse drive motor may transmit energy to the at least one transverse drive belt 211 for moving the drive portion 217, wherein the drive portion is rotated above the uppermost edge of the primary drive roller 111 of the conveyor 100 to transversely redirect one or more objects. In one or more embodiments, the drive portion 217 of at least one transverse drive belt 211 engages with at least one object while the belt is moving. The at least one sensing system 300 may be configured to send at least one more additional signal, directly or indirectly, to the transverse drive roller 210 to move or stop the belt 211. In one or more embodiments, the at least one signal sent from the at least one sensing system 300 to the at least one transverse drive roller 210 may be done by one or more wired connections. In various embodiments, the at least one signal sent from the at least one sensing system 300 to the at least one transverse drive roller 210 may be done by one or more wireless connections.

In at least one embodiment, the flow diagram of FIG. 14 may be performed by one or more of the devices and systems shown in any of FIGS. 1-13. With reference to FIG. 14, as depicted in step 1401, at least one sensing system may detect at least one object to be removed from the primary drive path of the main rollers 111, 112. Step 1402 may be completed sequentially after step 1401, or step 1402 may be completed simultaneously with step 1401, wherein the sensing system, directly or indirectly, sends a signal that may cause the transverse drive roller 210 to rotate the drive portion 217 to be disposed above the uppermost edge of the primary drive roller 111. As depicted in FIG. 14, the drive portion 217 of at least one transverse drive belt 211 may thereby engage with at least one object for transportation away from the primary drive path.

As depicted in the flowchart of FIG. 14, in step 1404, the at least one sensing system may continue to sense the object until the sensing system, with or without additional computing systems, determines that the object has cleared the conveyor unit, such that the main rollers 111, 112 may be reactivated or any portion of the conveyor may be otherwise used without impacting the movement of the detected object. The sensing system may be configured to then send an additional signals, directly or indirectly (e.g., with additional processing of the signals and new signal creation by one or more intermediary devices), that may cause the transverse drive roller 210 to stop and/or return the drive portion 217 to a neutral position at the bottom of the belt away from the main rollers 111, 112. Once the at least one sensing system determines that the object has cleared the conveyor unit, a new process may resume at step 1401 for the next object.

In some embodiments, the conveyor unit may be used for skew operation, in which an object is moved transversely while remaining atop the conveyor (e.g., for lateral alignment for downstream processes along the primary drive path).

In some embodiments, multiple objects may be tracked simultaneously and control instructions may be sent to the conveyor 100 based on the relative locations of the objects to effect movement of the objects to their respective destinations. In some embodiments, only a single revolution of the one or more transverse drive belts 211 may be needed to move an object from the primary drive path after which the belt may return the drive portion 217 to the lower side of the rollers. In some embodiments, the sensing system 300, including any intermediate control systems 400, may cause the transverse drive belts 211 to rotate continuously until the tracked object(s) are determined to be cleared of the conveyor.

Many modifications and other embodiments of the disclosure set forth herein will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A conveyor unit comprising:
   a conveyor frame;
   a main drive connected to the conveyor frame, the main drive comprising at least one main roller, the at least one main roller being configured to rotate about at least one main roller axis during conveyance of an object in a main drive direction orthogonal to the at least one main roller axis; and
   a transverse drive connected to the conveyor frame, the transverse drive comprising at least one transverse drive belt, the at least one transverse drive belt comprising a drive portion and a bypass portion each defined along an outward-facing surface of the at least one transverse drive belt,
   wherein the drive portion of the at least one transverse drive belt is configured to apply a force to the object in a direction at least partially parallel to the at least one main roller axis to drive the object in a transverse drive direction at least partially orthogonal to the at least one main roller axis, and
   wherein the drive portion comprises a plurality of teeth extending from the outward-facing surface of the at least one transverse drive belt.

2. The conveyor unit of claim 1, wherein the at least one transverse drive belt comprises a first transverse drive belt engaged with at least two parallel rollers, the at least two parallel rollers being disposed orthogonal to the at least one main roller axis, wherein at least one of the at least two parallel rollers are configured to drive the first transverse drive belt to apply the force to the object.

3. The conveyor unit of claim 2, wherein the at least one of the at least two parallel rollers is a motorized roller connected to the conveyor frame and configured to rotate about a transverse drive axis orthogonal to the at least one main roller.

4. The conveyor unit of claim 1, wherein the at least one transverse drive belt comprises a first transverse drive belt engaged with at least two pulleys, wherein at least one of the at least two pulleys are configured to drive the first transverse drive belt to apply the force to the object.

5. The conveyor unit of claim 1, wherein the at least one transverse drive belt comprises a plurality of transverse drive belts disposed parallel to each other.

6. The conveyor unit of claim 5, wherein the at least one main roller of the main drive comprises a plurality of main rollers, and wherein the plurality of transverse drive belts are disposed between respective ones of the plurality of main rollers.

7. The conveyor unit of claim 1, wherein the at least one main roller comprises a plurality of main rollers disposed parallel to each other.

8. The conveyor unit of claim 7, wherein the plurality of main rollers comprise at least one drive roller comprising a motor and at least one idler roller.

9. The conveyor unit of claim 1, wherein at least a portion of the plurality of teeth are one or more different heights than a second portion of the plurality of teeth.

10. The conveyor unit of claim 1, wherein at least a portion of the plurality of teeth are configured to protrude above an uppermost surface of the at least one main roller.

11. The conveyor unit of claim 1, wherein at least a portion of the drive portion is configured to protrude above an uppermost surface of the at least one main roller, such that the drive portion is configured to engage the object to convey the object in the transverse drive direction.

12. The conveyor unit of claim 1, wherein at least a portion of the bypass portion is configured to be disposed below an uppermost surface of the at least one main roller, such that the bypass portion is configured to allow the main drive to engage the object to convey the object in the main drive direction.

13. The conveyor unit of claim 1, wherein the at least one transverse drive belt comprises a plurality of transverse drive belts disposed parallel to each other, wherein the at least one main roller of the main drive comprises a plurality of main rollers, and wherein the plurality of transverse drive belts are disposed between respective ones of the plurality of main rollers.

14. A conveyor system comprising:
 a sensing system configured to detect a location associated with an object; and
 a plurality of conveyor units including a first conveyor unit and a second conveyor unit, the first conveyor unit comprising:
  a conveyor frame; and
  a main drive connected to the conveyor frame, the main drive comprising at least one main roller, the at least one main roller being configured to rotate about at least one main roller axis during conveyance of the object in a main drive direction orthogonal to the at least one main roller axis; and
  a transverse drive connected to the conveyor frame, the transverse drive comprising at least one transverse drive belt, the at least one transverse drive belt comprising a drive portion and a bypass portion each defined along an outward-facing surface of the at least one transverse drive belt,
  wherein the drive portion of the at least one transverse drive belt is configured to apply a force to the object in a direction at least partially parallel to the at least one main roller axis to drive the object in a transverse drive direction at least partially orthogonal to the at least one main roller axis,
  wherein the drive portion comprises a plurality of teeth extending from the outward-facing surface of the at least one transverse drive belt, and
  wherein the second conveyor unit is disposed adjacent the first conveyor unit in the transverse drive direction and configured to receive the object following movement of the object in the transverse drive direction.

15. The conveyor system of claim 14, wherein at least a portion of the drive portion is configured to protrude above an uppermost surface of the at least one main roller, such that the drive portion is configured to engage the object to convey the object in the transverse drive direction.

16. The conveyor system of claim 14, wherein at least a portion of the bypass portion is configured to be disposed below an uppermost surface of the at least one main roller, such that the bypass portion is configured to allow the main drive to engage the object to convey the object in the main drive direction.

17. A method of redirecting objects from a primary drive path, the method comprising:
 detecting, via a sensing system, a location associated with an object;
 triggering a transverse drive of a first conveyor unit to apply a force to the object in a transverse direction based on the location, wherein the first conveyor unit comprises:
  a conveyor frame; and
  a main drive connected to the conveyor frame, the main drive comprising at least one main roller, the at least one main roller being configured to rotate about at least one main roller axis during conveyance of the object in a main drive direction orthogonal to the at least one main roller axis,
  wherein the transverse drive is connected to the conveyor frame, the transverse drive comprising at least one transverse drive belt, the at least one transverse drive belt comprising a drive portion and a bypass portion each defined along an outward-facing surface of the at least one transverse drive belt,
  wherein the drive portion of the at least one transverse drive belt is configured to apply the force to the object in the transverse direction at least partially parallel to the at least one main roller axis to drive the object in a transverse drive direction at least partially orthogonal to the at least one main roller axis, and
  wherein the drive portion comprises a plurality of teeth extending from the outward-facing surface of the at least one transverse drive belt; and
 receiving the object, by a second conveyor unit disposed adjacent the first conveyor unit in the transverse drive direction, following movement of the object in the transverse drive direction.

18. The method of claim 17, wherein the sensing system comprises a computer vision system, wherein the computer vision system is configured to capture an image of the object and determine the location based on the image.

19. The method of claim 18, further comprising operating the transverse drive to rotate the at least one transverse drive belt until the bypass portion is facing upwards and stopping operation of the transverse drive.

\* \* \* \* \*